(12) United States Patent
Zhang et al.

(10) Patent No.: US 12,156,225 B2
(45) Date of Patent: Nov. 26, 2024

(54) COMMUNICATION METHOD, APPARATUS, AND DEVICE FOR COMMUNICATING CONFIGURATION INFORMATION

(71) Applicant: HUAWEI TECHNOLOGIES CO., LTD., Guangdong (CN)

(72) Inventors: Zhanzhan Zhang, Shanghai (CN); Xiaolei Tie, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 320 days.

(21) Appl. No.: 17/401,753

(22) Filed: Aug. 13, 2021

(65) Prior Publication Data

US 2021/0378000 A1    Dec. 2, 2021

Related U.S. Application Data

(63) Continuation of application No. PCT/CN2020/074831, filed on Feb. 12, 2020.

(30) Foreign Application Priority Data

Feb. 15, 2019  (CN) .......................... 201910117797.6

(51) Int. Cl.
*H04W 72/23*    (2023.01)
*H04L 5/00*    (2006.01)
(Continued)

(52) U.S. Cl.
CPC ........... *H04W 72/23* (2023.01); *H04L 5/0048* (2013.01); *H04W 24/08* (2013.01); *H04W 52/0209* (2013.01); *H04L 2025/03783* (2013.01)

(58) Field of Classification Search
CPC .............. H04W 72/12; H04W 72/121; H04W 72/1289; H04W 72/20; H04W 52/0209;
(Continued)

(56) References Cited

U.S. PATENT DOCUMENTS 11,877,310 B2 *   1/2024  Xu ...................... H04W 72/542
2015/0257132 A1 * 9/2015  Park ...................... H04B 7/068
                                                                    370/329
(Continued)

FOREIGN PATENT DOCUMENTS

CN    108631969 A    10/2018
CN    109151988 A    1/2019
(Continued)

OTHER PUBLICATIONS

Qualcomm Incorporated: "UE Power Consumption Reduction inRRM Measurements",3GPP Draft; R1-1900913, Jan. 20, 2019 (Jan. 20, 2019), XP051593759, Retrieved from the Internet.
(Continued)

*Primary Examiner* — Warner Wong

(57) ABSTRACT

The technology of this application relates to communications systems. In one example, a network device sends a first message to a terminal device, where the first message includes configuration information of a reference signal resource. The network device sends a second message to the terminal device, where the second message includes a first bit field and/or a second bit field, the first bit field is used to indicate an availability status of the reference signal resource, and the second bit field is used to indicate that the terminal device uses a synchronization signal/physical broadcast channel resource block signal resource and/or the reference signal resource.

20 Claims, 4 Drawing Sheets

(51) Int. Cl.
*H04W 24/08* (2009.01)
*H04W 52/02* (2009.01)
*H04L 25/03* (2006.01)

(58) Field of Classification Search
CPC ......... H04W 52/0212; H04W 52/0216; H04W 24/00; H04W 24/08; H04W 28/0221; H04W 36/165; H04W 52/00; H04W 52/02; H04W 52/143; H04W 52/146; H04W 52/18; H04W 68/02; H04L 5/0048; H04L 5/005; H04L 5/0051; H04L 12/2856; H04L 27/261; H04L 27/2613; H04L 2025/037823; H04L 2025/03783; H04L 1/0693
See application file for complete search history.

(56) References Cited

U.S. PATENT DOCUMENTS

| | | | |
|---|---|---|---|
| 2015/0271814 A1* | 9/2015 | Park | H04W 72/23 370/329 |
| 2017/0118001 A1* | 4/2017 | Yi | H04L 27/2601 |
| 2019/0104477 A1* | 4/2019 | MolavianJazi | H04W 72/23 |
| 2019/0207722 A1* | 7/2019 | Gao | H04B 7/088 |
| 2019/0261336 A1* | 8/2019 | Liu | H04L 5/005 |
| 2019/0268199 A1* | 8/2019 | Shi | H04L 5/0051 |
| 2020/0059878 A1* | 2/2020 | Huang | H04B 7/088 |
| 2020/0067674 A1* | 2/2020 | Guan | H04B 7/088 |
| 2020/0154446 A1* | 5/2020 | Yerramalli | H04W 72/23 |
| 2020/0177256 A1* | 6/2020 | Cha | H04L 5/005 |
| 2020/0235832 A1* | 7/2020 | Lee | H04L 27/2602 |
| 2020/0266865 A1* | 8/2020 | Gao | H04B 7/0626 |
| 2020/0267711 A1* | 8/2020 | Josan | H04W 24/10 |
| 2020/0275407 A1* | 8/2020 | Liu | H04W 68/02 |
| 2021/0051662 A1* | 2/2021 | Tang | H04W 68/005 |
| 2021/0068015 A1* | 3/2021 | Yang | H04W 72/0446 |
| 2021/0105636 A1* | 4/2021 | Yang | H04W 24/10 |
| 2021/0194553 A1* | 6/2021 | Chendamarai Kannan | H04L 5/0057 |
| 2021/0314910 A1* | 10/2021 | Rune | H04L 5/0094 |
| 2021/0321346 A1* | 10/2021 | Yang | H04W 68/00 |
| 2021/0409967 A1* | 12/2021 | Franke | H04W 24/10 |
| 2022/0353028 A1* | 11/2022 | Guan | H04L 1/0026 |
| 2023/0143073 A1* | 5/2023 | Li | H04W 74/0866 370/329 |
| 2023/0284098 A1* | 9/2023 | Kim | H04W 80/08 370/329 |

FOREIGN PATENT DOCUMENTS

| | | |
|---|---|---|
| WO | 2019028099 A1 | 2/2019 |
| WO | 2019031917 A1 | 2/2019 |

OTHER PUBLICATIONS

Vivo: "Summary#5 of UE power Consumption Reduction in RRMMeasurements",3GPP Draft; R1-1901466, Jan. 25, 2019 (Jan. 25, 2019), XP051601379, Retrieved from the Internet.

CATT: RRM measurement on power savin g . . . ,3GPP Draft; R1-1901327_REVR1-1900346, Jan. 21, 2019 (Jan. 21, 2019), XP051601267, Retrieved from the Internet.

CATT: "UE Power saving schemes with power saving signal/channel/procedures",3GPP Draft; R1-1900345, Jan. 12, 2019 (Jan. 12, 2019), XP051575954, Retrieved from the Internet.

Vivo: "Remaining issues on broadcast signals and channels", 3GPP Draft; R1-1808217, Aug. 10, 2018 (Aug. 10, 2018), XP051515602, Retrieved from the Internet.

European Search Report dated Mar. 16, 2022 for Application No. 20755798.4, 13 pages.

R1-1810415, vivo, On UE Power Consumption Reduction in RRM Measurements, 3GPP TSG RAN WG1 Meeting #94bis, Chengdu, China, Oct. 8-12, 2018, total 7 pages.

R1-1812643, CATT, UE Power saving scheme for RRM measurements, 3GPP TSG RAN WG1 Meeting #95, Spokane, USA, Nov. 12-16, 2018, total 6 pages.

R1-1813862, vivo, UE power Consumption Reduction in RRM Measurements, 3GPP TSG RAN WG1 Meeting #95, Spokane, US, Nov. 12-16, 2018, total 8 pages.

PCT International Search Report for Application No. PCT/CN2020/074831 dated Apr. 30, 2020, 9 pages.

MCC Support, Draft Report of 3GPP TSG RAN WG1 #90 v0.1.0 (Prague, Czech Rep, Aug. 21, 25, 2017), 3GPP TSG RAN WG1 Meeting #90bis R1-171xxxx, Prague, Czech Rep, Oct. 9, 13, 2017, 91 pages.

3GPP, TDoc List Meeting RAN1#90 (170825-eom), Aug. 2017, 167 pages.

Office Action dated Jan. 20, 2023 for Chinese Application No. 201910117797.6, 5 pages.

Office Action for Chinese Application No. 111585724 dated Jun. 27, 2023, 52 pages.

* cited by examiner

COMMUNICATION METHOD, APPARATUS, AND DEVICE FOR COMMUNICATING CONFIGURATION INFORMATION

CROSS-REFERENCE TO RELATED APPLICATIONS

This application is a continuation of International Application No. PCT/CN2020/074831, filed on Feb. 12, 2020, which claims priority to Chinese Patent Application No. 201910117797.6, filed on Feb. 15, 2019. The disclosures of the aforementioned applications are hereby incorporated by reference in their entireties.

TECHNICAL FIELD

This application relates to the field of communication technologies, and in particular, to a communication method, apparatus, and device.

BACKGROUND

In a mobile communication system, a base station may send a reference signal resource to user equipment (UE), so that the UE may perform a corresponding operation by using the reference signal resource. There may be a plurality of types of reference signal resources, for example, a synchronization signal/physical broadcast channel block (SSB) signal resource, a channel state information reference signal (CSI-RS) resource, and a secondary synchronization signal (SSS) resource.

However, the UE needs to consume a large amount of power when performing the corresponding operation by using the reference signal resource. Therefore, currently, a communication method for reducing power consumption of the UE needs to be provided.

SUMMARY

This application provides a communication method, apparatus, and device, to implement a precise operation performed by a terminal device, reduce power consumption of the terminal device, and improve processing performance of the terminal device.

According to a first aspect, this application provides a communication method, including: sending, by a network device, a first message to a terminal device, where the first message includes configuration information of a reference signal resource; and sending, by the network device, a second message to the terminal device, where the second message includes a first bit field and/or a second bit field, the first bit field is used to indicate an availability status of the reference signal resource, and the second bit field is used to indicate that the terminal device uses a synchronization signal/physical broadcast channel resource block signal resource and/or the reference signal resource.

According to the communication method provided in the first aspect, the network device may send, to the terminal device, the first message including the configuration information of the reference signal resource, so that the terminal device can learn, based on the first message, that in addition to the existing SSB signal resource, the network device further configures the reference signal resource. The network device may further send the second message including the first bit field and/or the second bit field to the terminal device. The first bit field indicates the availability status of the reference signal resource, and the second bit field indicates that the terminal device uses the existing SSB signal resource and/or the reference signal resource. Therefore, no additional always on signal is added for the reference signal resource, which meets an original design principle of reducing always-on signals in a new radio (NR) system. Further, the terminal device can clearly determine whether the reference signal resource is available and/or quickly select at least one of the existing SSB signal resource and reference signal resource to perform a corresponding operation such as radio resource management (RRM) measurement. This resolves a problem that the terminal device needs to perform an unnecessary operation due to discontinuous sending of the reference signal resource, thereby implementing a precise operation performed by the terminal device, helping reduce power consumption of the terminal device, avoiding an increase in the power consumption of the terminal device, improving operation accuracy of the terminal device, and improving processing performance of the terminal device.

According to a second aspect, this application provides a communication method, including: receiving, by a terminal device, a first message from a network device, where the first message includes configuration information of a reference signal resource; receiving, by the terminal device, a second message from the network device, where the second message includes a first bit field and/or a second bit field, the first bit field is used to indicate an availability status of the reference signal resource, and the second bit field is used to indicate that the terminal device uses a synchronization signal/physical broadcast channel resource block SSB signal resource and/or the reference signal resource; and performing, by the terminal device, radio resource management RRM measurement based on the first message and the second message.

According to the communication method provided in the second aspect, when receiving the first message that includes the configuration information of the reference signal resource and that is sent by the network device, the terminal device can learn, based on the first message, that in addition to the existing SSB signal resource, the network device further configures the reference signal resource. The terminal device receives the second message that includes the first bit field and/or the second bit field and that is sent by the network device. The first bit field indicates the availability status of the reference signal resource, and the second bit field indicates that the terminal device uses the existing SSB signal resource and/or the reference signal resource. Therefore, no additional always on signal is added for the reference signal resource, which meets an original design principle of reducing always-on signals in an NR system. Further, the terminal device can clearly determine whether the reference signal resource is available and/or quickly select at least one of the existing SSB signal resource and reference signal resource to perform a corresponding operation such as RRM measurement. This resolves a problem that the terminal device needs to perform an unnecessary operation due to discontinuous sending of the reference signal resource, thereby implementing a precise operation performed by the terminal device, helping reduce power consumption of the terminal device, avoiding an increase in the power consumption of the terminal device, improving operation accuracy of the terminal device, and improving processing performance of the terminal device.

In a possible design of the first aspect or the second aspect, the terminal device may perform corresponding operations such as RRM measurement, beam management (BM), and time-frequency tracking based on the reference signal resource. The reference signal resource may include at least one of the following resources: a channel state information reference signal resource, a newly added synchronization signal/physical broadcast channel resource block signal resource, and a secondary synchronization signal resource. The newly added SSB signal resource may be the same as the existing SSB signal resource, or may be different from the existing SSB signal resource. The configuration information of the reference signal resource includes but is not limited to a frequency domain width of the reference signal resource, a frequency domain density of the reference signal resource, and a periodicity of the reference signal resource.

In a possible design of the first aspect or the second aspect, one reference signal resource may be configured in the first message, or a plurality of reference signal resources may be configured in the first message. The plurality of reference signal resources may be of a same type, or may be of different types. The first message may be system information (SI), or may be another message other than the SI. The SI may include a master information block (MIB), system information block type 1 (SIB1), and other system information (OSI), that is, another SIB different from SIB1, for example, SIB2 to SIBn, where n>2, and n is a positive integer. The MIB includes a limited quantity of most basic and most commonly used parameters such as a downlink system bandwidth, SIB1 configuration information, and a system frame number (SFN) that are used to allow the terminal device to access a cell. SIB1 includes parameters related to broadcast cell access and cell selection, and OSI scheduling information. When the first message is the SI, for ease of configuration, based on the configuration information of the reference signal resource, the network device may configure the reference signal resource in SIB1, may configure the reference signal resource in the existing OSI, may configure the reference signal resource in newly added OSI, or may configure the reference signal resource in both SIB1 and the OSI. In addition, the network device may send the first message to the terminal device in a broadcast manner, or may send the first message to the terminal device based on a request message sent by the terminal device. The second message may be a paging message, or may be another message different from the paging message.

In a possible design of the first aspect or the second aspect, the first bit field is in downlink control information (DCI) in the second message. This helps the terminal device quickly search the DCI for the first bit field, and determine, in a timely manner, whether the reference signal resource is available.

In a possible design of the first aspect or the second aspect, when the DCI includes only scheduling information, bits included in the first bit field are at least one of the first to the eighth unused bits in a short messages field and six unused most significant bits in the DCI; when the DCI includes a short message, bits included in the first bit field are at least one of the third to the eighth unused bits in a short messages field and six unused most significant bits in the DCI; or when two bits in a short message indicator field indicate a reserved state, a bit included in the first bit field is at least one of all bits in the DCI other than the two bits.

In a possible design of the first aspect or the second aspect, the second bit field is in downlink control information in the second message. This helps the terminal device quickly search the DCI for the second bit field, and determine, in a timely manner, a status of using the reference signal resource and/or the existing SSB signal resource.

In a possible design of the first aspect or the second aspect, when the DCI includes only scheduling information, bits included in the second bit field are at least one of the first to the eighth unused bits in a short messages field and six unused most significant bits in the DCI; when the DCI includes a short message, bits included in the second bit field are at least one of the third to the eighth unused bits in a short messages field and six unused most significant bits in the DCI; or when two bits in a short message indicator field indicate a reserved state, a bit included in the second bit field is at least one of all bits in the DCI other than the two bits.

In a possible design of the first aspect or the second aspect, the reference signal resource includes at least one of the following resources: a channel state information reference signal resource, a newly added synchronization signal/physical broadcast channel resource block signal resource, and a secondary synchronization signal resource.

In a possible design of the first aspect or the second aspect, the second message further includes a third bit field, and the third bit field is used to indicate whether configuration information of a reference signal resource in a current first message is different from configuration information of a reference signal resource in a previous first message, or the third bit field is used to indicate whether a system information block that is in a current first message and that carries configuration information of a reference signal resource is different from a system information block that is in a previous first message already obtained by the terminal device and that carries configuration information of a reference signal resource.

According to the communication method provided in the implementations, when the configuration information of the reference signal resource and/or the configuration information carrying the reference signal resource change/changes, the terminal device needs to re-obtain a first message. To avoid wasting resources of the terminal device, the network device includes the third bit field in the second message, and sends the second message to the terminal device. Further, when receiving the third bit field, the terminal device may determine modified content in the re-obtained first message based on a meaning indicated by the third bit field. To be specific, when the third bit field indicates that the configuration information of the reference signal resource in the current first message is different from the configuration information of the reference signal resource in the previous first message, the terminal device needs to obtain only the configuration information of the reference signal resource from the current first message; when the third bit field indicates that the system information block in which the reference signal resource is configured in the current first message is different from the system information block in which the reference signal resource is configured in the previous first message, the terminal device needs to obtain, from the current first message, only the system message block carrying the configuration information of the reference signal resource. Further, the terminal device needs to obtain only the modified content in the first message, and does not need to obtain all content in the first message. This helps reduce power consumption of the terminal device.

In a possible design of the first aspect or the second aspect, the third bit field is in downlink control information in the second message. This helps the terminal device quickly search the DCI for the third bit field, to accurately determine the modified content in the re-obtained first message.

In a possible design of the first aspect or the second aspect, when the DCI includes only the scheduling information, bits included in the third bit field are the first to the eighth unused bits in the short messages field and at least one of the six unused most significant bits in the DCI; when the DCI includes the short message, bits included in the third bit field are the third to the eighth unused bits in the short messages field and at least one of the six unused most significant bits in the DCI; or when two bits in the short message indicator field indicate a reserved state, a bit included in the third bit field is at least one of all the bits in the DCI other than the two bits.

In a possible design of the first aspect or the second aspect, when the second message includes the first bit field, and the first bit field indicates that the reference signal resource is available, the first message further includes first information, where the first information is used to indicate first duration, and the first information is used to indicate that the reference signal resource is available in the first duration.

In a possible design of the first aspect or the second aspect, the first information is further used to indicate a start moment of the first duration; and the start moment of the first duration is a moment at which the terminal device receives a current second message, or the start moment of the first duration is a next paging moment at which the terminal device receives a current second message.

In a possible design of the first aspect or the second aspect, the first duration is m paging cycles of the second message, and m is a positive integer.

In a possible design of the first aspect or the second aspect, when the second message includes the first bit field, and the first bit field indicates that the reference signal resource is available, the second message further includes a fourth bit field, where the fourth bit field is used to indicate second duration, and the fourth bit field is used to indicate that the reference signal resource is available in the second duration.

In a possible design of the first aspect or the second aspect, the fourth bit field is further used to indicate a start moment of the second duration; and the start moment of the second duration is a moment at which the terminal device receives a current second message, or the start moment of the second duration is a next paging moment at which the terminal device receives a current second message.

In a possible design of the first aspect or the second aspect, the second duration is n paging cycles of the second message, and n is a positive integer.

In a possible design of the first aspect or the second aspect, the fourth bit field is in downlink control information in the second message.

In a possible design of the first aspect or the second aspect, when the DCI includes only the scheduling information, bits included in the fourth bit field are the first to the eighth unused bits in the short messages field and at least one of the six unused most significant bits in the DCI; when the DCI includes the short message, bits included in the fourth bit field are the third to the eighth unused bits in the short messages field and at least one of the six unused most significant bits in the DCI; or when two bits in the short message indicator field indicate a reserved state, a bit included in the fourth bit field is at least one of all the bits in the DCI other than the two bits.

In a possible design of the first aspect or the second aspect, when the second message includes the first bit field, and the first bit field indicates that the reference signal resource is available, the first message further includes second information, where the second information is used to indicate third duration, and the second information is used to indicate that the reference signal resource is available in the third duration in each paging cycle of the second message.

In a possible design of the first aspect or the second aspect, the second information is further used to indicate a start moment or an end moment of the third duration; where the start moment or the end moment of the third duration is any paging moment of the terminal device; or the start moment or the end moment of the third duration is a closest moment at which the network device sends the synchronization signal/physical broadcast channel resource block signal resource and that is before or after any paging moment of the terminal device.

In a possible design of the first aspect or the second aspect, when the second message includes the first bit field, and the first bit field indicates that the reference signal resource is available, the second message further includes a fifth bit field, where the fifth bit field is used to indicate fourth duration, and the fifth bit field is used to indicate that the reference signal resource is available in the fourth duration in each paging cycle of the second message.

In a possible design of the first aspect or the second aspect, the fifth bit field is further used to indicate a start moment or an end moment of the fourth duration; where the start moment or the end moment of the fourth duration is any paging moment of the terminal device; or the start moment or the end moment of the fourth duration is a closest moment at which the network device sends the synchronization signal/physical broadcast channel resource block signal resource and that is before or after any paging moment of the terminal device.

In a possible design of the first aspect or the second aspect, the fifth bit field is in downlink control information in the second message.

In a possible design of the first aspect or the second aspect, when the DCI includes only the scheduling information, bits included in the fifth bit field are the first to the eighth unused bits in the short messages field and at least one of the six unused most significant bits in the DCI; when the DCI includes the short message, bits included in the fifth bit field are the third to the eighth unused bits in the short messages field and at least one of the six unused most significant bits in the DCI; or when two bits in the short message indicator field indicate a reserved state, a bit included in the fifth bit field is at least one of all the bits in the DCI other than the two bits.

According to the communication method provided in the implementations, the network device may dynamically adjust, by using the first message and/or the second message, a time range in which the reference signal resource is available, so that the terminal device can determine the time range in which the reference signal resource is available, and the terminal device can properly select the reference signal resource to perform RRM measurement. Therefore, the terminal device is prevented from performing RRM measurement when the reference signal resource is unavailable, thereby implementing an accurate operation performed by the terminal device, and further improving the processing performance of the terminal device.

In a possible design of the first aspect or the second aspect, when the second message includes only the second bit field, and the second bit field indicates that the terminal device uses the reference signal resource, the first message further includes third information, where the third information is used to indicate fifth duration, and the third information is used to indicate that the terminal device uses the reference signal resource in the fifth duration.

In a possible design of the first aspect or the second aspect, the third information is further used to indicate a start moment of the fifth duration; where the start moment of the fifth duration is a moment at which the terminal device receives a current second message, or the start moment of the fifth duration is a next paging moment at which the terminal device receives a current second message.

In a possible design of the first aspect or the second aspect, the fifth duration is p paging cycles of the second message, and p is a positive integer.

In a possible design of the first aspect or the second aspect, when the second message includes only the second bit field, and the second bit field indicates that the terminal device uses the reference signal resource, the second message further includes a sixth bit field, where the sixth bit field is used to indicate sixth duration, and the sixth bit field is used to indicate that the terminal device uses the reference signal resource in the sixth duration.

In a possible design of the first aspect or the second aspect, the sixth bit field is further used to indicate a start moment of the sixth duration; where the start moment of the sixth duration is a moment at which the terminal device receives a current second message, or the start moment of the sixth duration is a next paging moment at which the terminal device receives a current second message.

In a possible design of the first aspect or the second aspect, the sixth duration is q paging cycles of the second message, and q is a positive integer.

In a possible design of the first aspect or the second aspect, the sixth bit field is in downlink control information in the second message.

In a possible design of the first aspect or the second aspect, when the DCI includes only the scheduling information, bits included in the sixth bit field are the first to the eighth unused bits in the short messages field and at least one of the six unused most significant bits in the DCI; when the DCI includes the short message, bits included in the sixth bit field are the third to the eighth unused bits in the short messages field and at least one of the six unused most significant bits in the DCI; or when two bits in the short message indicator field indicate a reserved state, a bit included in the sixth bit field is at least one of all the bits in the DCI other than the two bits.

In a possible design of the first aspect or the second aspect, when the second message includes only the second bit field, and the second bit field indicates that the terminal device uses the reference signal resource, the first message further includes fourth information, where the fourth information is used to indicate seventh duration, and the fourth information is used to indicate that the terminal device uses the reference signal resource in the seventh duration in each paging cycle of the second message.

In a possible design of the first aspect or the second aspect, the fourth information is further used to indicate a start moment or an end moment of the seventh duration; where the start moment or the end moment of the seventh duration is any paging moment of the terminal device; or the start moment or the end moment of the seventh duration is a closest moment at which the network device sends the SSB signal resource and that is before or after any paging moment of the terminal device.

In a possible design of the first aspect or the second aspect, when the second message includes only the second bit field, and the second bit field indicates that the terminal device uses the reference signal resource, the second message further includes a seventh bit field, where the seventh bit field is used to indicate eighth duration, and the seventh bit field is used to indicate that the terminal device uses the reference signal resource in the eighth duration in each paging cycle of the second message.

In a possible design of the first aspect or the second aspect, the seventh bit field is further used to indicate a start moment or an end moment of the eighth duration; where the start moment or the end moment of the eighth duration is any paging moment of the terminal device; or the start moment or the end moment of the eighth duration is a closest moment at which the network device sends the SSB signal resource and that is before or after any paging moment of the terminal device.

In a possible design of the first aspect or the second aspect, the seventh bit field is in downlink control information in the second message.

In a possible design of the first aspect or the second aspect, when the DCI includes only the scheduling information, bits included in the seventh bit field are the first to the eighth unused bits in the short messages field and at least one of the six unused most significant bits in the DCI; when the DCI includes the short message, bits included in the seventh bit field are the third to the eighth unused bits in the short messages field and at least one of the six unused most significant bits in the DCI; or when two bits in the short message indicator field indicate a reserved state, a bit included in the seventh bit field is at least one of all the bits in the DCI other than the two bits.

According to a third aspect, this application provides a communication apparatus. The apparatus may be a network device, or may be a chip in the network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs a corresponding function in the first aspect. When the apparatus is a chip in a network device, the processing unit may be a processor, and the transceiver unit may be an input/output interface, a pin, a circuit, or the like. The processing unit executes instructions stored in a storage unit, so that the network device performs a corresponding function in the first aspect. The storage unit may be a storage unit (for example, a register or a cache) inside the chip, or may be a storage unit (for example, a read-only memory (ROM) or a random access memory (RAM)) that is located outside the chip and that is inside the network device.

According to a fourth aspect, this application provides a communication apparatus. The apparatus may be a terminal device, or may be a chip in the terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs a corresponding function in the second aspect. When the apparatus is a chip in a terminal device, the processing unit may be a processor, and the transceiver unit may be an input/output interface, a pin, a circuit, or the like. The processing unit executes instructions stored in a storage unit, so that the terminal device performs a corresponding function in the second aspect. The storage unit may be a storage unit (for example, a register or a cache) inside the chip, or may be a storage unit (for example, a read-only memory or a random access memory) that is located outside the chip and that is inside the terminal device.

According to a fifth aspect, this application provides a readable storage medium. The readable storage medium stores executable instructions; and when at least one processor of a network device executes the executable instructions, the network device performs the communication method according to the first aspect and any one of the possible designs in the first aspect.

According to a sixth aspect, this application provides a readable storage medium. The readable storage medium stores executable instructions; and when at least one processor of a terminal device executes the executable instructions, the terminal device performs the communication method according to the second aspect and any one of the possible designs in the second aspect.

According to a seventh aspect, this application provides a program product. The program product includes executable instructions, and the executable instructions are stored in a readable storage medium. At least one processor of a network device may read the executable instructions in the readable storage medium, and the at least one processor executes the executable instructions, so that the network device implements the communication method according to the first aspect and any one of the possible designs in the first aspect.

According to an eighth aspect, this application provides a program product. The program product includes executable instructions, and the executable instructions are stored in a readable storage medium. At least one processor of a terminal device may read the executable instructions in the readable storage medium, and the at least one processor executes the executable instructions, so that the terminal device implements the communication method according to the second aspect and any one of the possible designs in the second aspect.

DESCRIPTION OF EMBODIMENTS

Figure 1:
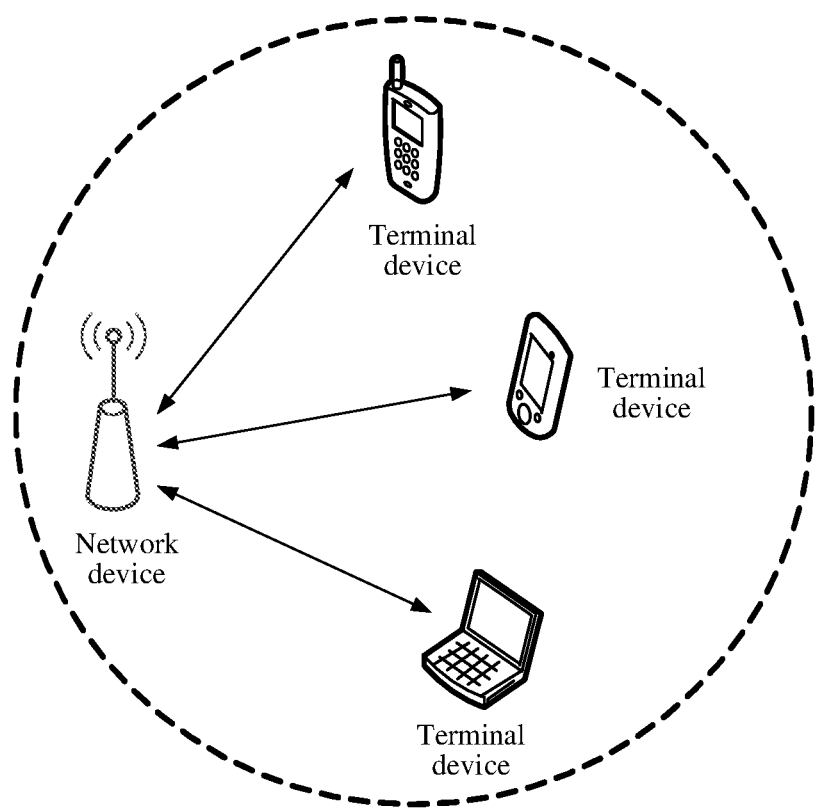
FIG. 1 is an example schematic architectural diagram of a communication system.

In embodiments of this application, the term "and/or" describes an association relationship between associated objects and may indicate three relationships. For example, A and/or B may indicate the following cases: Only A exists, both A and B exist, and only B exists, where A and B may be singular or plural. The term "at least one of the following items (e.g., pieces)" or a similar expression thereof means any combination of these items, including any combination of singular items (e.g., pieces) or plural items (e.g., pieces). For example, at least one of a, b, or c may indicate: a, b, c, a and b, a and c, b and c, or a, b, and c, where a, b, and c may be singular or plural.

The embodiments of this application may be applied to wireless communication systems. It should be noted that the wireless communication systems in the embodiments of this application include but are not limited to: a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and a 5th generation (5G) mobile communication system.

Communication apparatuses in this application mainly include a network device and a terminal device.

The network device may be a base station, an access point, or an access network device, or may be a device that is in an access network and that communicates with a wireless terminal through one or more sectors on an air interface. The network device may be configured to: perform mutual conversion on a received over-the-air frame and an IP packet, and serve as a router between the wireless terminal and another part of the access network, where the another part of the access network may include an Internet protocol (IP) network. The network device may further coordinate attribute management of the air interface. For example, the network device may be an evolved NodeB (eNB or eNodeB) in long term evolution (LTE), a relay node or an access point, or a NodeB in a 5G network, for example, a gNB. This is not limited herein.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges a voice and/or data with the radio access network. For example, it may be a device such as a personal communication service (PCS) phone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (or user equipment). This is not limited herein.

FIG. 1 is a schematic architectural diagram of a communication system. As shown in FIG. 1, the communication system in the embodiments of this application may include one or more network devices and one or more terminal devices, and the network devices communicate with the terminal devices.

The network device may send a reference signal resource to the terminal device, and the terminal device may perform, by using the reference signal resource, corresponding operations such as mobility radio resource management (RRM) measurement, beam management (BM), and time-frequency tracking.

The terminal device performs RRM measurement based on the reference signal resource, so that a terminal device in a radio resource control (RRC) idle mode (_IDLE) or in an RRC inactive mode (_INACTIVE) can perform cell selection/cell reselection, and a terminal device in an RRC connected mode (_CONNECTED) can perform cell handover.

Currently, there are two types of reference signal resources used for RRM measurement: a synchronization signal/physical broadcast channel resource block signal resource and a channel state information reference signal (CSI-RS) resource.

An SSB signal is a cell-level signal, and the SSB signal resource can be used when the terminal device is in an RRC idle mode/inactive mode/connected mode. The CSI-RS resource may be used only when the terminal device is in an RRC connected mode. In other words, when the terminal device is in the RRC connected mode, the network device usually configures, by using RRC signaling, a specific CSI-RS resource for RRM measurement. In addition, which type of reference signal resource is specifically used by the terminal device in the RRC connected mode is usually configured by using RRC signaling.

In one aspect, when the terminal device performs RRM measurement based on the SSB signal resource, if the network device has configured an SSB measurement time configuration (SMTC) for the terminal device, the terminal device can perform the RRM measurement only within an SMTC window duration. If the network device does not configure the SMTC for the terminal device, the terminal device may set a periodicity of the SSB signal to 5 ms. Generally, in a new radio (NR) system, a minimum periodicity of the SSB signal is 5 ms, and a maximum periodicity of the SSB signal is 160 ms.

In another aspect, operations mainly performed by the terminal device in the RRC idle mode/inactive mode include: monitoring a paging message and performing mobility RRM measurement. In addition, the network device usually configures a paging discontinuous reception (DRX) cycle for the terminal device. In each paging DRX cycle, the terminal device only needs to monitor a paging message on a paging occasion (PO) of the terminal device, and the terminal device may enter a sleep state at another moment without monitoring the paging message. The PO of the terminal device is determined by an identifier (ID) of the terminal device. Therefore, different terminal devices may have different POs.

Based on the foregoing content, first, the SSB signal is a cell-level signal, and therefore has a specific cycle interval, and the PO of the terminal device is related to the ID of the terminal device. Therefore, the SMTC window duration of the SSB signal may not be aligned with the PO of the terminal device in the paging DRX cycle. Further, the terminal device in the RRC idle mode/inactive mode not only needs to wake up when the paging message is monitored on the PO, but also needs to wake up when mobility RRM measurement is performed based on the SSB signal resource within the SMTC window duration. Consequently, the terminal device needs to wake up twice, or the terminal device maintains relatively long wake-up duration between the foregoing two processes. This is not conductive to power consumption reduction of the terminal device.

Second, after sleeping for a long time, the terminal device in the RRC idle mode/inactive mode needs to perform a preprocessing operation such as automatic gain control (AGC) tuning before waking up, to monitor a physical downlink control channel (PDCCH) in paging information and perform mobility RRM measurement. In addition, when a channel condition is relatively poor or a length of an orthogonal frequency division multiplexing (OFDM) symbol in a high frequency range (FR2) is relatively short, one SSB signal may be insufficient to complete a preprocessing process (for example, AGC tuning). As a result, the terminal device in the RRC idle mode/inactive mode cannot complete both preprocessing (for example, AGC tuning) and mobility RRM measurement within one SMTC window duration of the SSB signal, and needs to complete one time of mobility RRM measurement within two consecutive SMTC window durations of the SSB signal. In this case, the terminal device needs to maintain a wake-up state (or a light sleep state) between two consecutive SMTC window durations. This is further not conducive to power consumption reduction of the terminal device.

Then, because the periodicity of the SSB signal is relatively long, when a channel condition is relatively poor, the terminal device in the RRC idle mode/inactive mode needs to perform mobility RRM measurement based on a plurality of SSB signal resources, to meet a measurement precision requirement. In this case, the terminal device needs to maintain a relatively long wake-up time, and this is further not conducive to power consumption reduction of the terminal device.

Figure 2:
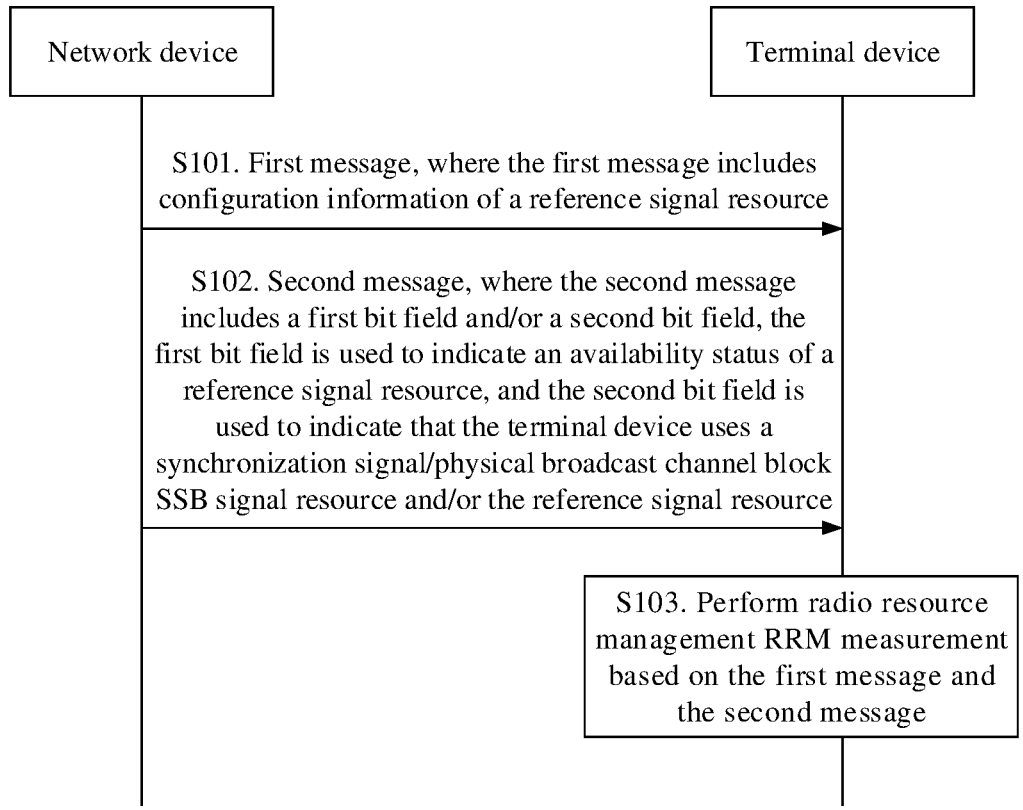
FIG. 2 is an example signaling flowchart of an embodiment of a communication method according to this application.

For the foregoing reasons, the terminal device in the RRC idle mode/inactive mode needs to consume a large amount of power to perform RRM measurement based on the SSB signal resource. Therefore, in consideration of the foregoing problems, the embodiments of this application provide a communication method, apparatus, and device, to reduce power consumption of a terminal device, and resolve the prior-art problems of a resource waste and a reduced device processing capability caused by increased power consumption of a terminal device when the terminal device performs RRM measurement based on an SSB signal resource. With reference to FIG. 2, the following describes in detail a specific implementation process of the communication method in the embodiments of this application.

FIG. 2 is a signaling flowchart of an embodiment of a communication method according to this application. As shown in FIG. 2, the method in this embodiment may include the following steps.

S101. A network device sends a first message to a terminal device, where the first message includes configuration information of a reference signal resource.

In an actual application process, the network device usually already configures an existing SSB signal resource for the terminal device, so that the terminal device can perform RRM measurement based on the existing SSB signal resource. In this embodiment of this application, in addition to the existing SSB signal resource that has been configured, the network device may additionally configure the reference signal resource. Specifically, the network device may configure the reference signal resource in the first message based on the configuration information of the reference signal resource, so that the terminal device can perform RRM measurement based on the reference signal resource.

In this embodiment of this application, the reference signal resource may be the same as the existing SSB signal resource, or may be different from the existing SSB signal resource. This is not limited in this embodiment of this application. In addition to the RRM measurement, the reference signal resource may further be used to perform corresponding operations such as BM and time-frequency tracking.

Optionally, the reference signal resource may include at least one of the following resources: a channel state information reference signal resource, a newly added synchronization signal/physical broadcast channel resource block signal resource, and a secondary synchronization signal resource.

The newly added SSB signal resource may be the same as the existing SSB signal resource, or may be different from the existing SSB signal resource. This is not limited in this embodiment of this application.

In addition, the configuration information of the reference signal resource includes but is not limited to a frequency domain width of the reference signal resource, a frequency domain density of the reference signal resource, and a periodicity of the reference signal resource.

In this embodiment of this application, one reference signal resource or a plurality of reference signal resources may be configured in the first message. The plurality of reference signal resources may be of a same type, or may be of different types. A specific quantity of reference signal resources in the first message and a specific type of a reference signal resource are not limited in this embodiment of this application.

The first message may be system information (SI), or may be another message other than the SI. This is not limited in this embodiment of this application.

A person skilled in the art may understand that the SI may include a master information block (MIB), system information block type 1 (SIB1), and other system information (OSI), that is, another SIB different from SIB1, for example, SIB2 to SIBn, where n>2, and n is a positive integer. The MIB includes a limited quantity of most basic and most commonly used parameters such as a downlink system bandwidth, SIB1 configuration information, and a system frame number (SFN) that are used to allow the terminal device to access a cell. SIB1 includes parameters related to broadcast cell access and cell selection, and OSI scheduling information.

When the first message is the SI, for ease of configuration, based on the configuration information of the reference signal resource, the network device may configure the reference signal resource in SIB1, may configure the reference signal resource in the existing OSI, may configure the reference signal resource in newly added OSI, or may configure the reference signal resource in both SIB1 and the OSI. This is not limited in this embodiment of this application.

In addition, the network device may send the first message to the terminal device in a broadcast manner, or may send the first message to the terminal device based on a request message sent by the terminal device. A specific manner of sending the first message by the network device to the terminal device is not limited in this embodiment of this application.

S102. The network device sends a second message to the terminal device, where the second message includes a first bit field and/or a second bit field, the first bit field is used to indicate an availability status of the reference signal resource, and the second bit field is used to indicate that the terminal device uses the synchronization signal/physical broadcast channel resource block signal resource and/or the reference signal resource.

S103. The terminal device performs radio resource management measurement based on the first message and the second message.

In an actual application process, there may be a problem that the reference signal resource newly added by the network device is discontinuously sent to the terminal device. An example in which the network device uses a CSI-RS resource configured for a terminal device in RRC connected mode is used. Although the CSI-RS has advantages of a relatively high frequency domain bandwidth and higher measurement precision than an SSB signal, and the CSI-RS resource is an existing resource configured by a cell for the terminal device in RRC connected mode, a person skilled in the art may understand that the CSI-RS resource is not continuously sent. In other words, if connected discontinuous reception (Connected-DRX, C-DRX) is configured for the terminal device in RRC connected mode, and a C-DRX cycle is greater than 80 ms, the network device may send, only in an active time in the C-DRX cycle, a CSI-RS resource used for RRM measurement to the terminal device. In a non-active time in the C-DRX cycle, the terminal device may choose to send the CSI-RS resource to the terminal device or choose not to send the CSI-RS resource to the terminal device. In this way, when the network device stops sending the CSI-RS resource to the terminal device, the terminal device in RRC idle mode/inactive mode still performs RRM measurement at a corresponding time-frequency position, for example, obtains a reference signal received power (RSRP) through the RRM measurement. Consequently, an RRM measurement result is inaccurate. In this case, the terminal device performs an unnecessary measurement process, causing unnecessary power consumption of the terminal device.

In addition to the problem that the reference signal resource may not be continuously sent, when the reference signal resource is a newly added reference signal resource, the reference signal resource causes an additional always-on signal added to the NR system. This violates an original design principle of reducing always-on signals in the NR system.

Based on the problems existing in the foregoing content, after the terminal device receives the first message, because the terminal device has learned that the network device newly adds the reference signal resource, the network device may further send the second message to the terminal device, so that the terminal device can select, based on the second message, the existing SSB signal resource and/or the reference signal resource to perform RRM measurement.

In this embodiment of this application, the second message is of a plurality of forms, and may include only the first bit field, may include only the second bit field, or may include both the first bit field and the second bit field. This is not limited in this embodiment of this application.

When the second message includes only the first bit field, because the first bit field indicates the availability status of the reference signal resource, the terminal device may determine, based on the first bit field, whether the reference signal resource is available or unavailable. Further, when the reference signal resource is available, the terminal device may select the existing SSB signal resource, may select the reference signal resource, or may select both the existing SSB signal resource and the reference signal resource, to perform RRM measurement. When the reference signal resource is unavailable, the terminal device may directly select the existing SSB signal resource to perform RRM measurement.

When the second message includes only the second bit field, because the second bit field indicates that the terminal device uses the existing SSB signal resource and/or the reference signal resource, the terminal device does not need to perform selection, and may directly determine, based on the second bit field, to use the existing SSB signal resource to perform RRM measurement, to use the reference signal resource to perform RRM measurement, or to use the existing SSB signal resource and the reference signal resource to perform RRM measurement.

When the second message includes the first bit field and the second bit field, because the first bit field indicates the availability status of the reference signal resource, and the second bit field indicates that the terminal device uses the existing SSB signal resource and/or the reference signal resource, the terminal device may first determine, based on the first bit field, whether the reference signal resource is available, and then determine, based on the second bit field, to use at least one of the existing SSB signal resource and the reference signal resource to perform RRM measurement; or may first determine, based on the second bit field, to use at least one of the existing SSB signal resource and the reference signal resource to perform RRM measurement, and then determine, based on the first bit field, whether the reference signal resource is available. In this way, the terminal device can determine, based on both the first bit field and the second bit field, which type of reference signal resource is used to perform RRM measurement. For a specific process, refer to processes corresponding to the foregoing two cases. Meanings of the first bit field and the second bit field are usually consistent.

Generally, when the first bit field indicates that the reference signal resource is available, the second bit field may indicate that the terminal device uses the existing SSB signal resource and/or the reference signal resource. When the first bit field indicates that the reference signal resource is unavailable, the second bit field may indicate that the terminal device uses the existing SSB signal resource. Correspondingly, when the second bit field indicates that the terminal device uses the reference signal resource, the first bit field indicates that the reference signal resource is available. When the second bit field indicates that the terminal device uses the existing SSB signal resource, the first bit field indicates that the reference signal resource is unavailable.

Further, based on the second message, the terminal device may determine whether the reference signal resource is available, and/or determine to use the reference signal resource to perform RRM measurement. This avoids a waste of resources caused by an unnecessary operation performed by the terminal device, helps reduce power consumption of the terminal device, and improves measurement accuracy of the terminal device.

It should be noted that when the terminal device may select both the existing SSB signal resource and the reference signal resource, the terminal device may determine, by comparing a moment at which the network device sends the existing SSB signal resource to the terminal device and a moment at which the network device sends the reference signal resource to the terminal device, a moment closer to a monitoring PO of the terminal device. Further, the terminal device may determine that a resource corresponding to the moment closer to the monitoring PO of the terminal device needs to be used to perform RRM measurement.

For example, when the reference signal resource is a CSI-RS resource, if the terminal device determines that a moment at which the network device sends the CSI-RS resource is closer to the monitoring PO of the terminal device in time domain than a moment at which the terminal device sends the existing SSB signal resource, the terminal device may determine that the terminal device needs to use the CSI-RS resource to perform RRM measurement. Specifically, the terminal device may choose to use the CSI-RS resource to perform RRM measurement, or may choose to use both the CSI-RS resource and the existing SSB signal resource to perform RRM measurement.

The second message may be a paging message, or may be another message other than the paging message. This is not limited in this embodiment of this application. In addition, positions of the first bit field and the second bit field in the second message are not limited in this embodiment of this application.

When the second message includes only the first bit field, if the second message is a paging message, optionally, the first bit field is in downlink control information (DCI) in the paging message. Specifically, the downlink control information in the paging message is carried on a physical downlink control channel (PDCCH) scrambled based on a paging-radio network temporary identifier (P-RNTI). The terminal device may demodulate the DCI that is on the PDCCH, to search the DCI in the paging message for the first bit field. Therefore, the terminal device can accurately and quickly determine, based on the first bit field, whether the reference signal resource is available, thereby reducing a processing time of the terminal device, and improving processing performance of the terminal device.

A person skilled in the art may understand that, in the NR system, the DCI used for the paging message mainly includes a short message indicator field, a short messages field, and another bit field. The another bit field includes an unused bit, and also includes a used bit.

The short message indicator field includes two bits, the two bits have four states (00, 01, 10, and 11), and the four states separately correspond to four functions. When the two bits are set to "00", a reserved state is indicated. When the two bits are set to "01", it indicates that the DCI in the paging message includes only scheduling information, and does not include a short message, that is, the SI does not change, and there is no public warning system (PWS) message. When the two bits are set to "10", it indicates that the DCI in the paging message includes only a short message, that is, the system information SI changes, and/or there is a PWS message notification. When the two bits are set to "11", it indicates that the DCI in the paging message includes both scheduling information and a short message, as shown in Table 1.

As shown in Table 2, the short messages field includes eight bits. When the two bits in the short message indicator field are set to "10" or "11", it indicates that the DCI in the paging message includes the short message. In this case, the first bit and the second bit in the short messages field are used, and the third bit to the eighth bit are not used. When the first bit is set to "0", it indicates that the system information does not change, that is, the network device does not modify the system information SI (the modification herein may be understood as that current system information is different from previous system information). When the first bit is set to "1", it indicates that the system information SI changes, that is, the network device modifies the system information SI. When the second bit is set to "0", it indicates that there is no PWS message notification. When the second bit is set to "1", it indicates that there is a PWS message notification. When the two bits in the short message indicator field are set to "00" or "01", it indicates that the DCI in the paging message does not include the short message. In this case, none of the first to the eighth bits in the short messages field is used.

TABLE 1

| Status of two bits | Function |
| --- | --- |
| 00 | Reserved state |
| 01 | The DCI in the paging message includes only scheduling information |
| 10 | The DCI in the paging message includes only a short message |
| 11 | The DCI in the paging message includes both scheduling information and a short message |

TABLE 2

| $N^{th}$ bit, where N is a positive integer | Function |
| --- | --- |
| 1 | If the bit is set to "0", it indicates that the system information does not change |
| | If the bit is set to "1", it indicates that the system information changes |
| 2 | If the bit is set to "0", it indicates that there is no PWS message notification |
| | If the bit is set to "1", it indicates that there is a PWS message notification |
| 3 to 8 | Unused |

Based on the foregoing content, there are a plurality of cases for the DCI, and cases corresponding to unused bits in the DCI are different in each case. Therefore, while ensuring that the DCI has an existing function, the network device may set, based on different cases of the DCI by using an unused bit in the DCI, bits included in the first bit field. The bits included in the first bit field may have a plurality of forms. For ease of description, a specific implementation form of the bits included in the first bit field is described in detail below with reference to the three cases of the DCI.

When the DCI includes only the scheduling information, that is, when the two bits in the short message indicator field are set to "01", it can be learned with reference to content in Table 1 and Table 2 that, none of the first to the eighth bits in the short messages field and six unused most significant bits in the DCI is used. Therefore, the network device may set the bits included in the first bit field to be the first to the eighth unused bits in the short messages field and one or more of the six unused most significant bits in the DCI.

For example, when determining that the two bits in the short message indicator field are set to "01", the network device may set the first bit in the short messages field to be a bit included in the first bit field. When the first bit in the short messages field is set to "1", it indicates that the reference signal resource is available. When the first bit in the short messages field is set to "0", it indicates that the reference signal resource is unavailable.

Alternatively, when determining that the two bits in the short message indicator field are set to "01", the network device may set any two of the six most significant bits in the DCI to be bits included in the first bit field. When any two of the six most significant bits in the DCI are both set to "1", it indicates that the reference signal resource is available. When any two of the six most significant bits in the DCI are both set to "0", it indicates that the reference signal resource is unavailable.

When the DCI includes the short message, that is, when the two bits in the short message indicator field are set to "10" or "11", it can be learned with reference to content in Table 1 and Table 2 that, none of the third to the eighth bits in the short messages field and six unused most significant bits in the DCI is used. Therefore, the network device may set the bits included in the first bit field to be the third to the eighth unused bits in the short messages field and one or more of the six unused most significant bits in the DCI.

For example, when determining that the two bits in the short message indicator field are set to "10" or "11", the network device may set the third bit in the short messages field to be a bit included in the first bit field. When the third bit in the short messages field is set to "1", it indicates that the reference signal resource is available. When the third bit in the short messages field is set to "0", it indicates that the reference signal resource is unavailable.

Alternatively, when determining that the two bits in the short message indicator field are set to "10" or "11", the network device may set any two of the six most significant bits in the DCI to be bits included in the first bit field. When any two of the six most significant bits in the DCI are both set to "1", it indicates that the reference signal resource is available. When any two of the six most significant bits in the DCI are both set to "0", it indicates that the reference signal resource is unavailable.

When the two bits in the short message indicator field indicate the reserved state, that is, when the two bits in the short message indicator field are set to "00", it can be learned with reference to content in Table 1 and Table 2 that none of bits in the DCI is used. Therefore, the network device may set a bit included in the first bit field to be one or more bits in all the bits in the DCI other than the two bits.

For example, when determining that the two bits in the short message indicator field are set to "00", the network device may set the first bit in the short messages field to be a bit included in the first bit field. When the first bit in the short messages field is set to "1", it indicates that the reference signal resource is available. When the first bit in the short messages field is set to "0", it indicates that the reference signal resource is unavailable.

Alternatively, when the two bits in the short message indicator field are set to "00", the network device may set any two of the six most significant bits in the DCI to be bits included in the first bit field. When any two of the six most significant bits in the DCI are both set to "1", it indicates that the reference signal resource is available. When any two of the six most significant bits in the DCI are both set to "0", it indicates that the reference signal resource is unavailable.

It should be noted that in this embodiment of this application, the bits included in the first bit field are not limited to the foregoing implementations, and the bits included in the first bit field may further include other bits. This is not described in detail herein, provided that the first bit field indicates the availability status of the reference signal resource.

When the second message includes only the second bit field, if the second message is a paging message, optionally, the second bit field is in DCI in the paging message. Specifically, the downlink control information in the paging message is carried on a PDCCH scrambled based on a P-RNTI. The terminal device may demodulate the DCI that is on the PDCCH, to search the DCI in the paging message for the second bit field. Therefore, the terminal device can accurately and quickly determine, based on the second bit field, whether to use the reference signal resource, thereby reducing a processing time of the terminal device, and improving processing performance of the terminal device.

Based on content of setting the bits included in the first bit field by the network device, a specific implementation form of bits included in the second bit field may also be described in detail with reference to the three cases of the DCI in this embodiment of this application.

When the DCI includes only the scheduling information, the bits included in the second bit field are at least one of the first to the eighth unused bits in the short messages field and six unused most significant bits in the DCI.

For example, when determining that the two bits in the short message indicator field are set to "01", the network device may set the fourth bit in the short messages field to be a bit included in the second bit field. When the fourth bit in the short messages field is set to "1", it indicates that the terminal device uses the reference signal resource, to be specific, it indicates that the terminal device uses only the reference signal resource, or it indicates that the terminal device uses the reference signal resource and the existing SSB signal resource. When the fourth bit in the short messages field is set to "0", it indicates that the terminal device does not use the reference signal resource, to be specific, it indicates that the terminal device uses the existing SSB signal resource.

Alternatively, when determining that the two bits in the short message indicator field are set to "01", the network device may set any two of the six most significant bits in the DCI to be bits included in the second bit field. When any two of the six most significant bits in the DCI are both set to "1", it indicates that the terminal device uses the reference signal resource, to be specific, it indicates that the terminal device uses only the reference signal resource, or it indicates that the terminal device uses the reference signal resource and the existing SSB signal resource. When any two of the six most significant bits in the DCI are both set to "0", it indicates that the terminal device does not use the reference signal resource, to be specific, it indicates that the terminal device uses the existing SSB signal resource.

When the DCI includes the short message, the bits included in the second bit field are at least one of the third to the eighth unused bits in the short messages field and six unused most significant bits in the DCI.

For example, when determining that the two bits in the short message indicator field are set to "10" or "11", the network device may set the third bit in the short messages field to be a bit included in the second bit field. When the third bit in the short messages field is set to "1", it indicates that the terminal device uses the reference signal resource, to be specific, it indicates that the terminal device uses only the reference signal resource, or it indicates that the terminal device uses the reference signal resource and the existing SSB signal resource. When the third bit in the short messages field is set to "0", it indicates that the terminal device does not use the reference signal resource, to be specific, it indicates that the terminal device uses the existing SSB signal resource.

Alternatively, when determining that the two bits in the short message indicator field are set to "10" or "11", the network device may set any two of the six most significant bits in the DCI to be bits included in the second bit field. When any two of the six most significant bits in the DCI are both set to "1", it indicates that the terminal device uses the reference signal resource, to be specific, it indicates that the terminal device uses only the reference signal resource, or it indicates that the terminal device uses the reference signal resource and the existing SSB signal resource. When any two of the six most significant bits in the DCI are both set to "0", it indicates that the terminal device does not use the reference signal resource, to be specific, it indicates that the terminal device uses the existing SSB signal resource.

When the two bits in the short message indicator field indicate the reserved state, a bit included in the second bit field is at least one of all bits in the DCI other than the two bits.

For example, when determining that the two bits in the short message indicator field are set to "00", the network device may set the fourth bit in the short messages field to be a bit included in the second bit field. When the fourth bit in the short messages field is set to "1", it indicates that the terminal device uses the reference signal resource, to be specific, it indicates that the terminal device uses only the reference signal resource, or it indicates that the terminal device uses the reference signal resource and the existing SSB signal resource. When the fourth bit in the short messages field is set to "0", it indicates that the terminal device does not use the reference signal resource, to be specific, it indicates that the terminal device uses the existing SSB signal resource.

Alternatively, when determining that the two bits in the short message indicator field are set to "00", the network device may set any two of the six most significant bits in the DCI to be bits included in the second bit field. When any two of the six most significant bits in the DCI are both set to "1", it indicates that the terminal device uses the reference signal resource, to be specific, it indicates that the terminal device uses only the reference signal resource, or it indicates that the terminal device uses the reference signal resource and the existing SSB signal resource. When any two of the six most significant bits in the DCI are both set to "0", it indicates that the terminal device does not use the reference signal resource, to be specific, it indicates that the terminal device uses the existing SSB signal resource.

It should be noted that, in this embodiment of this application, the bits included in the second bit field are not limited to the foregoing implementations, and the bits included in the second bit field may further include other bits. This is not described in detail herein, provided that the second bit field indicates that the terminal device uses the reference signal resource and/or the existing SSB signal resource.

When the second message includes the first bit field and the second bit field, if the second message is a paging message, optionally, both the first bit field and the second bit field are in DCI in the paging message. Specifically, the DCI in the paging message is carried on a PDCCH scrambled based on a P-RNTI. The terminal device may demodulate the DCI that is on the PDCCH, to search the DCI in the paging message for the first bit field and the second bit field. Therefore, the terminal device can accurately and quickly determine, based on the first bit field, whether the reference signal resource is available, and accurately and quickly determine, based on the second bit field, whether to use the reference signal resource, thereby reducing a processing time of the terminal device, and improving processing performance of the terminal device For the bits included in the first bit field and the bits included in the second bit field, refer to the cases in which the second message includes only the first bit field and the second message includes only the second bit field. Details are not described herein, provided that different bits in the DCI are used when the bits included in the first bit field are different from the bits included in the second bit field.

Further, when the terminal device receives the first message (for example, system information) including the reference signal resource, if the network device sends the second message (for example, a paging message) to the terminal device, when monitoring the second message (for example, the paging message) on the PO, the terminal device may further learn of, by using the first bit field, whether the reference signal resource is available, may further learn of, by using the second bit field, a status of using the reference signal resource and/or the existing SSB signal resource, or may further learn of, by using the first bit field and the second bit field, both the availability status of the reference signal resource and the status of using the reference signal resource and/or the existing SSB signal resource. In this way, the terminal device does not need to wake up for a plurality of times, and does not need to keep long wake-up duration, thereby reducing power consumption of the terminal device.

According to the communication method provided in this embodiment of this application, the network device sends, to the terminal device, the first message including the configuration information of the reference signal resource, so that the terminal device can learn, based on the first message, that in addition to the existing SSB signal resource, the network device further configures the reference signal resource. The network device further sends the second message including the first bit field and/or the second bit field to the terminal device. The first bit field indicates the availability status of the reference signal resource, and the second bit field indicates that the terminal device uses the existing SSB signal resource and/or the reference signal resource. Therefore, no additional always on signal is added for the reference signal resource, which meets an original design principle of reducing always-on signals in an NR system. Further, the terminal device can clearly determine, based on the second message, whether the reference signal resource is available and/or quickly select at least one of the existing SSB signal resource and reference signal resource based on the second message to perform a corresponding operation such as RRM measurement. This resolves a problem that the terminal device needs to perform an unnecessary operation due to discontinuous sending of the reference signal resource, thereby implementing a precise operation performed by the terminal device, helping reduce power consumption of the terminal device, avoiding an increase in the power consumption of the terminal device, improving operation accuracy of the terminal device, and improving processing performance of the terminal device.

A person skilled in the art may understand that when the first message changes, the network device needs to modify the first message, and the terminal device also needs to re-obtain the first message. However, in an actual application process, if the DCI indicates that the first message changes, the terminal device in RRC idle mode/inactive mode reads all content in the first message, increasing power consumption of the terminal device. For example, the first message is a system message. When the DCI indicates that the first message changes, the terminal device needs to obtain all content in the system message that includes a MIB, SIB1, and OSI.

To resolve the foregoing problem, based on the embodiment shown in FIG. 2, the second message further includes a third bit field. The third bit field may be used to indicate whether configuration information of a reference signal resource in a current first message is different from configuration information of a reference signal resource in a previous first message, or the third bit field may be used to indicate whether a system information block that carries configuration information of a reference signal resource in a current first message is different from a system information block that carries configuration information of a reference signal resource in a previous first message.

A system information block may carry configuration information of a reference signal resource. When the first message is SI, the system information block may be at least one of SIB1, existing OSI, or newly added OSI.

Further, when the terminal device determines that the second message includes the third bit field, the terminal device may determine modified content in the first message based on a meaning indicated by the third bit field. Further, the terminal device needs to obtain only the modified content in the first message, and does not need to obtain all content in the first message. This helps reduce power consumption of the terminal device.

When the third bit field indicates that the configuration information of the reference signal resource in the current first message is different from the configuration information of the reference signal resource in the previous first message, the terminal device needs to obtain only the configuration information of the reference signal resource from the current first message, and does not need to obtain all content in the first message, thereby reducing power consumption of the terminal device.

When the third bit field indicates that the system information block in which the reference signal resource is configured in the current first message is different from the system information block in which the reference signal resource is configured in the previous first message, the terminal device needs to obtain, from the current first message, only the system information block in which the reference signal resource is configured, and does not need to obtain all content in the first message, thereby reducing power consumption of the terminal device.

A position of the third bit field in the second message is not limited in this embodiment of this application. When the second message is a paging message, optionally, the third bit field is in the DCI in the paging message. Specifically, the DCI in the paging message is carried on the PDCCH scrambled based on the P-RNTI. The terminal device may demodulate the DCI that is on the PDCCH, to search the DCI in the paging message for the third bit field. Therefore, the terminal device can quickly determine whether to re-obtain the modified content in the first message, and can accurately obtain the modified content in the first message when obtaining the third bit field, thereby reducing power consumption of the terminal device, and improving processing performance of the terminal device.

Based on content of setting the bits included in the first bit field by the network device, a specific implementation form of bits included in the third bit field may also be described in detail with reference to the three cases of the DCI in this embodiment of this application.

When the DCI includes only the scheduling information, the bits included in the third bit field are the first to the eighth unused bits in the short messages field and at least one of the six unused most significant bits in the DCI.

For example, when determining that the two bits in the short message indicator field are set to "01", the network device may set the first bit in the short messages field to be a bit included in the third bit field. When the first bit in the short messages field is set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When the first bit in the short messages field is set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

Alternatively, when determining that the two bits in the short message indicator field are set to "01", the network device may set any two of the six most significant bits in the DCI to be bits included in the third bit field. When any two of the six most significant bits in the DCI are both set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When any two of the six most significant bits in the DCI are both set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

When the DCI includes the short message, the bits included in the third bit field are the third to the eighth unused bits in the short messages field and at least one of the six unused most significant bits in the DCI.

For example, when determining that the two bits in the short message indicator field are set to "10" or "11", the network device may set the third bit in the short messages field to be a bit included in the third bit field. When the third bit in the short messages field is set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When the third bit in the short messages field is set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

Alternatively, when determining that the two bits in the short message indicator field are set to "10" or "11", the network device may set any two of the six most significant bits in the DCI to be bits included in the third bit field. When any two of the six most significant bits in the DCI are both set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When any two of the six most significant bits in the DCI are both set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

When the two bits in the short message indicator field indicate the reserved state, a bit included in the third bit field is at least one of all the bits in the DCI other than the two bits.

For example, when determining that the two bits in the short message indicator field are set to "00", the network device may set the first bit in the short messages field to be a bit included in the third bit field. When the first bit in the short messages field is set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When the first bit in the short messages field is set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

Alternatively, when determining that the two bits in the short message indicator field are set to "00", the network device may set any two of the six most significant bits in the DCI to be bits included in the third bit field. When any two of the six most significant bits in the DCI are both set to "1", it indicates that the configuration information of the reference signal resource in the current first message is different from the configuration information of the reference signal resource in the previous first message, or it indicates that the system information block in which the reference signal resource is configured in the current first message is different from the system information block in which the reference signal resource is configured in the previous first message. When any two of the six most significant bits in the DCI are both set to "0", it indicates that the configuration information of the reference signal resource in the current first message is the same as the configuration information of the reference signal resource in the previous first message, or it indicates that the system information block in which the reference signal resource is configured in the current first message is the same as the system information block in which the reference signal resource is configured in the previous first message.

It should be noted that, in this embodiment of this application, the bits included in the third bit field are not limited to the foregoing implementations, and the bits included in the third bit field may further include other bits. Generally, the network device may set the first bit field, the third bit field, and the second bit field by using different bits.

According to the communication method provided in this embodiment of this application, when the configuration information of the reference signal resource and/or the configuration information that carries the reference signal resource change/changes, the terminal device needs to re-obtain the first message. To avoid wasting resources of the terminal device, the network device includes the third bit field in the second message, and sends the second message to the terminal device. Further, when receiving the third bit field, the terminal device may determine modified content in the re-obtained first message based on a meaning indicated by the third bit field. To be specific, when the third bit field indicates that the configuration information of the reference signal resource in the current first message is different from the configuration information of the reference signal resource in the previous first message, the terminal device needs to obtain only the configuration information of the reference signal resource from the current first message; when the third bit field indicates that the system information block in which the reference signal resource is configured in the current first message is different from the system information block in which the reference signal resource is configured in the previous first message, the terminal device needs to obtain, from the current first message, only the system message block carrying the configuration information of the reference signal resource. Further, the terminal device needs to obtain only the modified content in the first message, and does not need to obtain all content in the first message. This helps reduce power consumption of the terminal device and save resources of the terminal device.

For example, with reference to the foregoing embodiment, when the second message includes the first bit field, and the first bit field indicates that the reference signal resource is available, the second message may include only the first bit field that indicates that the reference signal resource is available, or the second message may include the second bit field and the first bit field that indicates that the reference signal resource is available. In addition, because the reference signal resource may not be continuously sent, the network device may further set, by using the first message and/or the second message, a time range in which the reference signal resource is available, so that the network device can dynamically adjust the time range in which the reference signal resource is available. The following uses specific embodiments to describe in detail a specific process of setting the time range in which the reference signal resource is available.

In a feasible implementation, in addition to the configuration information of the reference signal resource, the first message may further include first information. The first information is used to indicate first duration, and the first information is used to indicate that the reference signal resource is available in the first duration. Therefore, when the terminal device receives the second message that includes the first bit field and that is sent by the network device, and the first bit field is used to indicate that the reference signal resource is available, the terminal device may determine, based on the first information, that the reference signal resource is available in the first duration, and the terminal device determines that the reference signal resource is unavailable beyond the first duration. In this way, the terminal device can be prevented from performing RRM measurement on the reference signal resource when the reference signal resource is unavailable, to reduce power consumption of the terminal device and improve processing performance of the terminal device.

In this embodiment of this application, to ensure that the terminal device performs RRM measurement based on the reference signal resource in the time range in which the reference signal resource is available, the terminal device can negotiate with the network device in advance about a length of the first duration, for example, a default value, or may determine a length of the first duration based on the first information, for example, a number or an identifier at a fixed position in the first information. This is not limited in this embodiment of this application.

For example, if the number at the fixed position in the first information is 1, the first duration is 5 seconds. If the number at the fixed position in the first information is a, the first duration is 5 seconds.

The first duration may be in a unit of an absolute time (for example, ms or s), a symbol, a slot, a subframe, a frame, or the like. In addition, a specific implementation form of the first duration is not limited in this embodiment of this application. Because the first bit field indicates that the reference signal resource is available, to dynamically adjust the time range in which the reference signal resource is available, optionally, the first information may be further used to indicate a start moment of the first duration. Generally, the start moment of the first duration may be a moment at which the terminal device receives a current second message. Alternatively, the start moment of the first duration may be a next paging moment at which the terminal device receives a current second message. This is not limited in this embodiment of this application.

Further, to help the terminal device set the first duration, optionally, the first duration may be m paging cycles of the second message, and m is a positive integer. A manner of configuring m may be pre-specified between the network device and the terminal device. For example, m is 1 by default. Alternatively, the manner of configuring m may be configured by using one or more bits in the first message and/or the second message. This is not limited in this embodiment of this application.

For example, the terminal device may directly determine a value of m based on a number corresponding to a status of one or more bits in the first message and/or the second message. Using two bits in the first message as an example, when the two bits in the first message may be set to "00", it may indicate that m is 1, that is, the first duration is one paging cycle of the second message. When the two bits in the first message may be set to "01", it may indicate that m is 2, that is, the first duration is two paging cycles of the second message. When the two bits in the first message may be set to "10", it may indicate that m is 3, that is, the first duration is three paging cycles of the second message. When the two bits in the first message may be set to "11", it may indicate that m is 4, that is, the first duration is four paging cycles of the second message.

Alternatively, the terminal device may pre-configure a list based on a correspondence between a size of m and a status of one or more bits in the first message and/or the second message. Using two bits in the first message as an example, when the two bits in the first message may be set to "00", it may be determined, according to the list, that m is 1, that is, the first duration is one paging cycle of the second message. When the two bits in the first message may be set to "01", it may be determined, according to the list, that m is 2, that is, the first duration is two paging cycles of the second message. When the two bits in the first message may be set to "10", it may be determined, according to the list, that m is 3, that is, the first duration is three paging cycles of the second message. When the two bits in the first message may be set to "11", it may be determined, according to the list, that m is 4, that is, the first duration is four paging cycles of the second message.

In another feasible implementation, the second message may further include a fourth bit field. The fourth bit field is used to indicate second duration, and the fourth bit field is used to indicate that the reference signal resource is available in the second duration. Therefore, when the terminal device receives the second message that includes the first bit field and that is sent by the network device, and the first bit field is used to indicate that the reference signal resource is available, the terminal device may determine, based on the fourth bit field, that the reference signal resource is available in the second duration, and the terminal device determines that the reference signal resource is unavailable beyond the second duration. In this way, the terminal device can be prevented from performing RRM measurement on the reference signal resource when the reference signal resource is unavailable, to reduce power consumption of the terminal device and improve processing performance of the terminal device.

A position of the fourth bit field in the second message is not limited in this embodiment of this application. When the second message is a paging message, optionally, the fourth bit field is in the DCI in the paging message. Specifically, the DCI in the paging message is carried on the PDCCH scrambled based on the P-RNTI. The terminal device may demodulate the DCI that is on the PDCCH, to search the DCI in the paging message for the fourth bit field. Therefore, the terminal device can accurately determine, based on the fourth bit field, that the reference signal resource is available in the second duration. This avoids an unnecessary operation caused by performing, by the terminal device, RRM measurement based on the reference signal resource at a moment beyond the second duration, improves measurement accuracy of the terminal device, and improves processing performance of the terminal device.

Based on content of setting the bits included in the first bit field by the network device, a specific implementation form of bits included in the fourth bit field may also be described in detail with reference to the three cases of the DCI in this embodiment of this application.

In addition, to ensure that the terminal device performs RRM measurement based on the reference signal resource in the time range in which the reference signal resource is available, the terminal device can negotiate with the network device in advance about a length of the second duration, or may determine a length of the second duration by configuring a list based on a correspondence between a range of the second duration and a number corresponding to a status of one or more bits in the fourth bit field.

When the DCI includes only the scheduling information, the bits included in the fourth bit field are the first to the eighth unused bits in the short messages field and at least one of the six unused most significant bits in the DCI.

For example, when determining that the two bits in the short message indicator field are set to "01", the network device may set the first bit in the short messages field to be a bit included in the fourth bit field. When the first bit in the short messages field is set to "0", it indicates that the second duration is the first value in the list indicating the range of the second duration. When the first bit in the short messages field is set to "1", it indicates that the second duration is the second value in the list indicating the range of the second duration.

Alternatively, when determining that the two bits in the short message indicator field are set to "01", the network device may set any two of the six most significant bits in the DCI to be bits included in the fourth bit field. When any two of the six most significant bits in the DCI are both set to "1", the length of the second duration may be determined according to the list, and it indicates that the reference signal resource is available in the second duration.

When the DCI includes the short message, the bits included in the fourth bit field are the third to the eighth unused bits in the short messages field and at least one of the six unused most significant bits in the DCI.

For example, when determining that the two bits in the short message indicator field are set to "10" or "11", the network device may set the third bit in the short messages field to be a bit included in the fourth bit field. When the third bit in the short messages field is set to "0", it indicates that the second duration is the first value in the list indicating the range of the second duration. When the third bit in the short messages field is set to "1", it indicates that the second duration is the second value in the list indicating the range of the second duration.

Alternatively, when determining that the two bits in the short message indicator field are set to "10" or "11", the network device may set any two of the six most significant bits in the DCI to be bits included in the fourth bit field.

When any two of the six most significant bits in the DCI are both set to "1", the length of the second duration may be determined according to the list, and it indicates that the reference signal resource is available in the second duration.

When the two bits in the short message indicator field indicate the reserved state, a bit included in the fourth bit field is at least one of all the bits in the DCI other than the two bits.

For example, when determining that the two bits in the short message indicator field are set to "00", the network device may set the first bit in the short messages field to be a bit included in the fourth bit field. When the first bit in the short messages field is set to "1", the length of the second duration may be determined according to the list, and it indicates that the reference signal resource is available in the second duration. When the first bit in the short messages field is set to "0", the length of the second duration may be determined according to the list, and it indicates that the reference signal resource is unavailable in the second duration.

Alternatively, when determining that the two bits in the short message indicator field are set to "00", the network device may set any two of the six most significant bits in the DCI to be bits included in the fourth bit field. When any two of the six most significant bits in the DCI are both set to "1", the length of the second duration may be determined according to the list, and it indicates that the reference signal resource is available in the second duration.

It should be noted that, in this embodiment of this application, the bits included in the fourth bit field are not limited to the foregoing implementations, and the bits included in the fourth bit field may further include other bits. The fourth bit field may be included in the second message only when the second message includes the first bit field. Therefore, the network device may set the first bit field and the fourth bit field by using different bits. In addition, when the second message further includes at least one of the second bit field and the third bit field, the network device further needs to ensure that the fourth bit field and the bit field are set by using different bits.

The second duration may be in a unit of an absolute time (for example, ms or s), a symbol, a slot, a subframe, a frame, or the like. In addition, a specific implementation form of the second duration is not limited in this embodiment of this application. Because the first bit field indicates that the reference signal resource is available, to dynamically adjust the time range in which the reference signal resource is available, optionally, the fourth bit field may be further used to indicate a start moment of the second duration.

Generally, the start moment of the second duration may be a moment at which the terminal device receives a current second message. Alternatively, the start moment of the second duration may be a next paging moment at which the terminal device receives a current second message. This is not limited in this embodiment of this application.

When the fourth bit field indicates the start moment of the second duration, the terminal device may directly determine the start moment of the second duration based on the number corresponding to the status of the one or more bits in the fourth bit field, or the terminal device may pre-configure a list based on a correspondence between the status of the one or more bits in the fourth bit field and the start moment of the second duration, to determine the start moment of the second duration.

For example, when determining that the two bits in the short message indicator field are set to "01", the network device may set the first bit in the short messages field to be a bit included in the fourth bit field. When the first bit in the short messages field is set to "1", it indicates that the start moment of the second duration is the next paging moment at which the terminal device receives the current second message. When the first bit in the short messages field is set to "0", it indicates that the start moment of the second duration is the moment at which the terminal device receives the current second message.

Alternatively, the network device may set any two of the six most significant bits in the DCI to bits included in the fourth bit field. When any two of the six most significant bits in the DCI are all set to "1", it indicates that the start moment of the second duration is the next paging moment at which the terminal device receives the current second message. When any two of the six most significant bits in the DCI are set to "0", it indicates that the start moment of the second duration is the moment at which the terminal device receives the current second message.

Further, to help the terminal device set the second duration, optionally, the second duration may be n paging cycles of the second message, and n is a positive integer. A manner of configuring n is the same as the manner of configuring m.

When the fourth bit field indicates the second duration, namely, the quantity n, the terminal device may directly determine the quantity n based on the number corresponding to the status of the one or more bits in the fourth bit field, or the terminal device may pre-configure a list based on a correspondence between a value of n and the status of the one or more bits in the fourth bit field, to determine the quantity n.

For example, when determining that the two bits in the short message indicator field are set to "01", the network device may set the first bit in the short messages field to be a bit included in the fourth bit field. When the first bit in the short messages field is set to "0", it may indicate that n is 1, or it may be determined, according to the list, that n is 1, that is, the second duration is one paging cycle of the second message. When the first bit in the short messages field is set to "1", it may indicate that n is 2, or it may be determined, according to the list, that n is 2, that is, the second duration is two paging cycles of the second message.

Alternatively, the network device may set any two of the six most significant bits in the DCI to bits included in the fourth bit field. When any two of the six most significant bits in the DCI are both set to "0", it may indicate that n is 1, or it may be determined, according to the list, that n is 1, that is, the second duration is one paging cycle of the second message. When any two of the six most significant bits in the DCI are both set to "1", it may indicate that n is 4, or it may be determined, according to the list, that n is 4, that is, the second duration is four paging cycles of the second message.

In addition, when the fourth bit field indicates both the start moment of the second duration and the quantity n, the terminal device may determine the start moment of the second duration and the quantity n based on the number corresponding to the status of the one or more bits in the fourth bit field, may separately determine the start moment of the second duration and the quantity n based on a number corresponding to a status of each of a plurality of bits in the fourth bit field, or may determine the start moment of the second duration and the quantity n by pre-configuring a list based on a correspondence between a value of n and the status of the one or more bits in the fourth bit field.

For example, when determining that the two bits in the short message indicator field are set to "01", the network device may set the first bit in the short messages field to be a bit included in the fourth bit field. When the first bit in the short messages field is set to "0", it indicates that the start moment of the second duration is the moment at which the terminal device receives the current second message, and it may indicate that n is 1, or it may be determined, according to the list, that n is 1, that is, the second duration is one paging cycle of the second message. When the first bit in the short messages field is set to "1", it indicates that the start moment of the second duration is the next paging moment at which the terminal device receives the current second message, and it may indicate that n is 2, or it may be determined, according to the list, that n is 2, that is, the second duration is two paging cycles of the second message.

Alternatively, the network device may set any two of the six most significant bits in the DCI to bits included in the fourth bit field. When any two of the six most significant bits in the DCI are both set to "0", it indicates that the start moment of the second duration is the moment at which the terminal device receives the current second message, and it may indicate that n is 1, or it may be determined, according to the list, that n is 1, that is, the second duration is one paging cycle of the second message. When any two of the six most significant bits in the DCI are both set to "1", it indicates that the start moment of the second duration is the next paging moment at which the terminal device receives the current second message, and it may indicate that n is 4, or it may be determined, according to the list, that n is 4, that is, the second duration is four paging cycles of the second message. In addition, the terminal device may determine the start moment of the second duration based on one of the two bits, and determine the quantity n based on the other bit.

It should be noted that in the foregoing two feasible implementations, the first duration and the second duration may be the same or may be different. This is not limited in this embodiment of this application.

In another feasible implementation, in addition to the configuration information of the reference signal resource, the first message may further include second information. The second information is used to indicate third duration, and the second information is used to indicate that the reference signal resource is available in third duration in each paging cycle of the second message. Therefore, when the terminal device receives the second message that includes the first bit field and that is sent by the network device, and the first bit field is used to indicate that the reference signal resource is available, the terminal device may determine, based on the second information, that the reference signal resource is available in the third duration in each paging cycle of the second message, and the terminal device determines that the reference signal resource is unavailable beyond the third duration. In this way, the terminal device can be prevented from performing RRM measurement on the reference signal resource when the reference signal resource is unavailable. In addition, the network device may set the third duration near the paging moment of the terminal device. In this way, when waking up to monitor a PDCCH on the PO, the terminal device can use the reference signal resource to perform a specific operation, for example, RRM measurement. This avoids a problem that power consumption is wasted because the terminal device wakes up for a plurality of times at a moment far away from the PO to merely use the reference signal resource, to reduce power consumption of the terminal device and improve processing performance of the terminal device.

In this embodiment of this application, to ensure that the terminal device performs RRM measurement based on the reference signal resource in the time range in which the reference signal resource is available, the terminal device can negotiate with the network device in advance about a length of the third duration, for example, a default value, or may determine a length of the third duration based on the second information, for example, a number or an identifier at a fixed position in the second information. This is not limited in this embodiment of this application.

For example, if the number at the fixed position in the second information is 1, the third duration is 20 milliseconds. If the number at the fixed position in the second information is a, the third duration is 20 milliseconds.

The third duration may be in a unit of an absolute time (for example, ms or s), a symbol, a slot, a subframe, a frame, or the like. In addition, a specific implementation form of the third duration is not limited in this embodiment of this application. Because the first bit field indicates that the reference signal resource is available, to dynamically adjust the time range in which the reference signal resource is available, optionally, the second information may be further used to indicate a start moment or an end moment of the third duration.

Figure 3A:
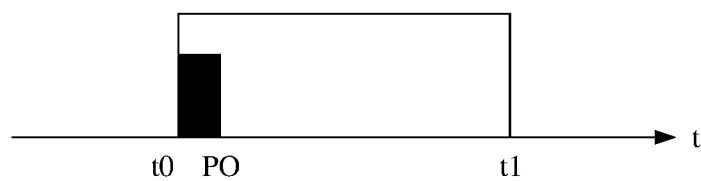
FIG. 3a is an example schematic diagram of a time range of third duration in an embodiment of a communication method according to this application.
Figure 3B:
FIG. 3b is an example schematic diagram of a time range of third duration in an embodiment of a communication method according to this application.

Generally, the start moment or the end moment of the third duration may be any paging moment of the terminal device. For ease of description, FIG. 3a shows that the start moment of the third duration is any paging moment of the terminal device, and FIG. 3b shows that the end moment of the third duration is any paging moment of the terminal device. In FIG. 3a and FIG. 3b, the start moment of the third duration is t0, the end moment of the third duration is t1, and the paging moment of the terminal device is PO.

Further, the start moment or the end moment of the third duration is any paging moment of the terminal device, in other words, the start moment or the end moment of the third duration is PO. Therefore, when monitoring the second message (for example, a paging message) on the PO, the terminal device may determine, when a next paging cycle following a paging cycle of the current second message starts, that the reference signal resource is available. In this way, the terminal device can properly use the reference signal resource to perform RRM measurement, without a need of waking up for a plurality of times or keeping wake-up duration, thereby reducing power consumption of the terminal device, and improving performance of the terminal device.

Figure 3C:
FIG. 3c is an example schematic diagram of a time range of third duration in an embodiment of a communication method according to this application.
Figure 3D:
FIG. 3d is an example schematic diagram of a time range of third duration in an embodiment of a communication method according to this application.

Alternatively, the start moment or the end moment of the third duration may be a closest moment at which the network device sends the existing SSB signal resource and that is before or after any paging moment of the terminal device. For ease of description, FIG. 3c shows that the start moment of the third duration is a closest moment at which the network device sends the existing SSB signal resource and that is before any paging moment of the terminal device, and FIG. 3d shows that the end moment of the third duration is a closest moment at which the network device sends the existing SSB signal resource and that is after any paging moment of the terminal device. In FIG. 3c and FIG. 3d, the start moment of the third duration is t0, the end moment of the third duration is t1, the paging moment of the terminal device is PO, the closest moment at which the network device sends the existing SSB signal resource and that is before the paging moment of the terminal device is SSB1, and the closest moment at which the network device sends the existing SSB signal resource and that is after the paging moment of the terminal device is SSB2, and SSB1 and SSB2 belong to different SMTC window durations.

Further, the start moment or the end moment of the third duration may be the closest moment at which the network device sends the existing SSB signal resource and that is before or after the paging moment of the terminal device, that is, the start moment or the end moment of the third duration is a moment of sending the existing SSB signal resource. Therefore, when the terminal device monitors the second message (for example, a paging message) on the PO, or when a next paging cycle following a paging cycle of the current second message starts, the terminal device can determine that the reference signal resource is available. In this way, the terminal device can properly select a resource from moments of the reference signal resource and the existing SSB signal resource to perform RRM measurement, without a need of waking up for a plurality of times or keeping wake-up duration, thereby reducing power consumption of the terminal device, and improving performance of the terminal device.

In another feasible implementation, the second message may further include a fifth bit field. The fifth bit field is used to indicate fourth duration, and the fifth bit field is used to indicate that the reference signal resource is available in fourth duration in each paging cycle of the second message. Therefore, when the terminal device receives the second message that includes the first bit field and that is sent by the network device, and the first bit field is used to indicate that the reference signal resource is available, the terminal device may determine, based on the fifth bit field, that the reference signal resource is available in the fourth duration in each paging cycle of the second message, and the terminal device determines that the reference signal resource is unavailable beyond the fourth duration. In this way, the terminal device can be prevented from performing RRM measurement on the reference signal resource when the reference signal resource is unavailable. In addition, the network device may configure the fourth duration to be near the paging moment of the terminal device. In this way, when waking up to monitor a PDCCH on the PO, the terminal device can use the reference signal resource to perform a specific operation, for example, RRM measurement. This avoids a problem that power consumption is wasted because the terminal device wakes up for a plurality of times at a moment far away from the PO to merely use the reference signal resource, to reduce power consumption of the terminal device and improve processing performance of the terminal device.

A position of the fifth bit field in the second message is not limited in this embodiment of this application. When the second message is a paging message, optionally, the fifth bit field is in the DCI in the paging message. Specifically, the DCI in the paging message is carried on the PDCCH scrambled based on the P-RNTI. The terminal device may demodulate the DCI that is on the PDCCH, to search the DCI in the paging message for the fifth bit field. Therefore, the terminal device can accurately determine, based on the fifth bit field, that the reference signal resource is available in the fourth duration in each paging cycle of the terminal device. This avoids an unnecessary operation caused by performing, by the terminal device, RRM measurement based on the reference signal resource at a moment beyond the fourth duration, improves measurement accuracy of the terminal device, and improves processing performance of the terminal device.

Based on content of setting the bits included in the first bit field by the network device, a specific implementation form of bits included in the fifth bit field may also be described in detail with reference to the three cases of the DCI in this embodiment of this application.

In addition, for the ease of performing, by the terminal device, RRM measurement based on the reference signal resource in the time range in which the reference signal resource is available, the terminal device can negotiate with the network device in advance about a length of the fourth duration, or may determine a length of the fourth duration by configuring a list based on a correspondence between a range of the fourth duration and a number corresponding to a status of one or more bits in the fifth bit field.

When the DCI includes only the scheduling information, the bits included in the fifth bit field are the first to the eighth unused bits in the short messages field and at least one of the six unused most significant bits in the DCI.

For example, when determining that the two bits in the short message indicator field are set to "01", the network device may set the first bit in the short messages field to be a bit included in the fifth bit field. When the first bit in the short messages field is set to "1", the length of the fourth duration may be determined according to the list, and it indicates that the reference signal resource is available in the fourth duration in each paging cycle of the second message. When the first bit in the short messages field is set to "0", the length of the fourth duration may be determined according to the list, and it indicates that the reference signal resource is available in the fourth duration in each paging cycle of the second message.

Alternatively, when determining that the two bits in the short message indicator field are set to "01", the network device may set any two of the six most significant bits in the DCI to be bits included in the fifth bit field. When any two of the six most significant bits in the DCI are both set to "1", the length of the fourth duration may be determined according to the list, and it indicates that the reference signal resource is available in the fourth duration in each paging cycle of the second message.

When the DCI includes the short message, the bits included in the fifth bit field are the third to the eighth unused bits in the short messages field and at least one of the six unused most significant bits in the DCI.

For example, when determining that the two bits in the short message indicator field are set to "10" or "11", the network device may set the third bit in the short messages field to be a bit included in the fifth bit field. When the third bit in the short messages field is set to "1", the length of the fourth duration may be determined according to the list, and it indicates that the reference signal resource is available in the fourth duration in each paging cycle of the second message. When the third bit in the short messages field is set to "0", the length of the fourth duration may be determined according to the list, and it indicates that the reference signal resource is available in the fourth duration in each paging cycle of the second message.

Alternatively, when determining that the two bits in the short message indicator field are set to "10" or "11", the network device may set any two of the six most significant bits in the DCI to be bits included in the fifth bit field. When any two of the six most significant bits in the DCI are both set to "1", the length of the fourth duration may be determined according to the list, and it indicates that the reference signal resource is available in the fourth duration in each paging cycle of the second message.

When the two bits in the short message indicator field indicate the reserved state, a bit included in the fifth bit field is at least one of all the bits in the DCI other than the two bits.

For example, when determining that the two bits in the short message indicator field are set to "00", the network device may set the first bit in the short messages field to be a bit included in the fifth bit field. When the first bit in the short messages field is set to "1", the length of the fourth duration may be determined according to the list, and it indicates that the reference signal resource is available in the fourth duration in each paging cycle of the second message. When the first bit in the short messages field is set to "0", the length of the fourth duration may be determined according to the list, and it indicates that the reference signal resource is available in the fourth duration in each paging cycle of the second message.

Alternatively, when determining that the two bits in the short message indicator field are set to "00", the network device may set any two of the six most significant bits in the DCI to be bits included in the fifth bit field. When any two of the six most significant bits in the DCI are both set to "1", the length of the fourth duration may be determined according to the list, and it indicates that the reference signal resource is available in the fourth duration in each paging cycle of the second message.

It should be noted that, in this embodiment of this application, the bits included in the fifth bit field are not limited to the foregoing implementations, and the bits included in the fifth bit field may further include other bits. The fifth bit field may be included in the second message only when the second message includes the first bit field. Therefore, the network device may set the first bit field and the fifth bit field by using different bits. In addition, when the second message further includes at least one of the second bit field, the third bit field, and the fourth bit field, the network device further needs to ensure that the fifth bit field and the bit field are set by using different bits.

The fourth duration may be in a unit of an absolute time (for example, ms or s), a symbol, a slot, a subframe, a frame, or the like. In addition, a specific implementation form of the fourth duration is not limited in this embodiment of this application. Because the first bit field indicates that the reference signal resource is available, to dynamically adjust the time range in which the reference signal resource is available, optionally, the fifth bit field may be further used to indicate a start moment or an end moment of the fourth duration.

Generally, the start moment or the end moment of the fourth duration may be any paging moment of the terminal device. For a manner of configuring the fourth duration, refer to the manner of configuring the third duration in FIG. 3a and FIG. 3b. Alternatively, the start moment or the end moment of the fourth duration may be a closest moment at which the network device sends the existing SSB signal resource and that is before or after any paging moment of the terminal device. For a manner of configuring the fourth duration, refer to the manner of configuring the third duration in FIG. 3c and FIG. 3d. This is not limited in this embodiment of this application.

When the fifth bit field indicates the start moment or the end moment of the fourth duration, the terminal device may directly determine the start moment or the end moment of the fourth duration based on the number corresponding to the status of the one or more bits in the fifth bit field, or the terminal device may pre-configure a list based on a correspondence between the status of the one or more bits in the fifth bit field and the start moment or the end moment of the fourth duration, to determine the start moment or the end moment of the fourth duration.

For example, when determining that the two bits in the short message indicator field are set to "01", the network device may set the first bit in the short messages field to be a bit included in the fifth bit field. When the first bit in the short messages field is set to "1", it indicates that the start moment of the fourth duration is a closest moment at which the network device sends the existing SSB signal resource and that is before any paging moment of the terminal device. When the first bit in the short messages field is set to "0", it indicates that the start moment of the fourth duration is any paging moment of the terminal device.

Alternatively, the network device may set any two of the six most significant bits in the DCI to bits included in the fourth bit field. When any two of the six most significant bits in the DCI are both set to "1", it indicates that the start moment of the fourth duration is a closest moment at which the network device sends the existing SSB signal resource and that is before any paging moment of the terminal device. When any two of the six most significant bits in the DCI are both set to "0", it indicates that the end moment of the fourth duration is any paging moment of the terminal device.

It should be noted that in the foregoing two feasible implementations, the third duration and the fourth duration may be the same or may be different. This is not limited in this embodiment of this application.

Figure 4:
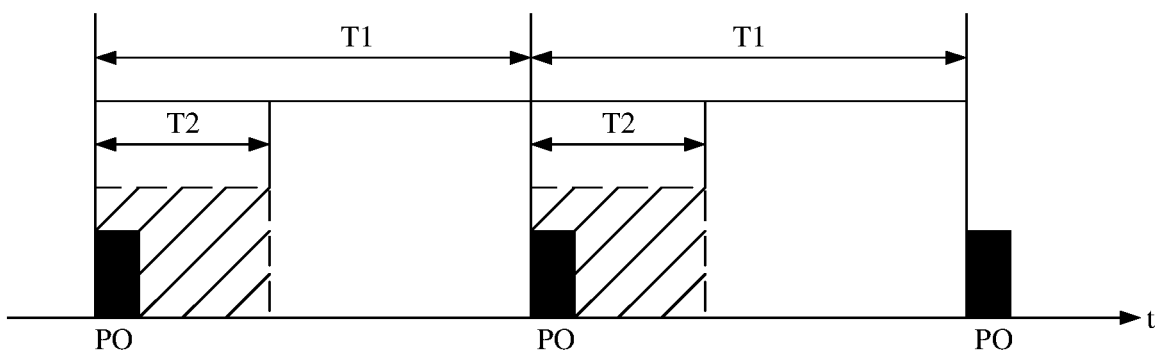
FIG. 4 is an example schematic diagram of overlapping duration of first duration and third duration in an embodiment of a communication method according to this application.

Further, based on the foregoing four feasible implementations, when the terminal device learns of at least two of the first duration, the second duration, the third duration, and the fourth duration, the reference signal resource is usually available in overlapping duration of the at least two durations. For ease of description, with reference to FIG. 4, an example in which the terminal learns of both the first duration and the third duration is used for description. As shown in FIG. 4, the network device configures that the first duration is two paging cycles of the second message (one paging cycle of the second message is T1), that is, the first duration is 2T1, and that the start moment of the first duration is the moment at which the terminal device receives the current second message, in other words, the start moment of the first duration is the PO of the terminal device; the network device configures that the third duration is T2, and that the start moment of the third duration is the moment at which the terminal device receives the current second message, in other words, the start moment of the first duration is also the PO of the terminal device. In this case, overlapping duration of the first duration and the third duration is a shadow part (that is, T2 in each paging cycle) in FIG. 4. That is, the reference signal resource is available in the overlapping duration (that is, T2 in each paging cycle) corresponding to the shadow part.

Further, the network device may dynamically adjust, by using the first message and/or the second message, a time range in which the reference signal resource is available, so that the terminal device can determine the time range in which the reference signal resource is available, and the terminal device can properly select the reference signal resource to perform RRM measurement. Therefore, the terminal device is prevented from performing RRM measurement when the reference signal resource is unavailable, thereby implementing an accurate operation performed by the terminal device, and further improving the processing performance of the terminal device.

For example, with reference to the foregoing embodiment, when the second message includes only the second bit field, and the second bit field indicates that the terminal device uses the reference signal resource, because the reference signal resource may not be continuously sent, the network device may further configure, by using the first message and/or the second message, the time range in which the reference signal resource is used, so that the network device can dynamically adjust the time range in which the terminal device uses the reference signal resource. The following uses specific embodiments to describe in detail a specific process of setting the time range in which the reference signal resource is used.

In a feasible implementation, in addition to the configuration information of the reference signal resource, the first message may further include third information. The third information is used to indicate fifth duration, and the third information is used to indicate that the terminal device uses the reference signal resource in the fifth duration. Therefore, when the terminal device receives the second message that includes the second bit field and that is sent by the network device, and the second bit field is used to indicate that the reference signal resource is used, the terminal device may determine, based on the third information, that the reference signal resource is used in the fifth duration, and the terminal device determines that the reference signal resource is not used beyond the fifth duration. In this way, the terminal device can be prevented from performing RRM measurement on the reference signal resource when the reference signal resource is unavailable, to reduce power consumption of the terminal device and improve processing performance of the terminal device.

In this embodiment of this application, to ensure that the terminal device performs RRM measurement based on the reference signal resource in the time range in which the reference signal resource is used, the terminal device can negotiate with the network device in advance about a length of the fifth duration, for example, a default value, or may determine a length of the fifth duration based on the third information, for example, a number or an identifier at a fixed position in the third information. This is not limited in this embodiment of this application.

For example, if the number at the fixed position in the third information is 1, the fifth duration is 5 seconds. If the number at the fixed position in the third information is a, the fifth duration is 5 seconds.

The fifth duration may be in a unit of an absolute time (for example, ms or s), a symbol, a slot, a subframe, a frame, or the like. In addition, a specific implementation form of the fifth duration is not limited in this embodiment of this application. Because the second bit field indicates that the terminal device uses the reference signal resource, to dynamically adjust the time range in which the reference signal resource is used, optionally, the third information may be further used to indicate a start moment of the fifth duration. Generally, the start moment of the fifth duration may be a moment at which the terminal device receives a current second message. Alternatively, the start moment of the fifth duration may be a next paging moment at which the terminal device receives a current second message. This is not limited in this embodiment of this application.

Further, to help the terminal device configure the fifth duration, optionally, the fifth duration may be p paging cycles of the second message, and p is a positive integer. A manner of configuring p is the same as the manner of configuring m.

In another feasible implementation, the second message may further include a sixth bit field. The sixth bit field is used to indicate sixth duration, and the sixth bit field is used to indicate that the terminal device uses the reference signal resource in the sixth duration. Therefore, when the terminal device receives the second message that includes the second bit field and that is sent by the network device, and the second bit field is used to indicate that the reference signal resource is used, the terminal device may determine, based on the sixth bit field, that the reference signal resource is used in the sixth duration, and the terminal device determines that the reference signal resource is not used beyond the sixth duration. In this way, the terminal device can be prevented from performing RRM measurement on the reference signal resource when the reference signal resource is unavailable, to reduce power consumption of the terminal device and improve processing performance of the terminal device.

A position of the sixth bit field in the second message is not limited in this embodiment of this application. When the second message is a paging message, optionally, the sixth bit field is in the DCI in the paging message. Specifically, the DCI in the paging message is carried on the PDCCH scrambled based on the P-RNTI. The terminal device may demodulate the DCI that is on the PDCCH, to search the DCI in the paging message for the sixth bit field. Therefore, the terminal device can accurately determine, based on the sixth bit field, that the reference signal resource is used in the sixth duration. This avoids an unnecessary operation caused by performing, by the terminal device, RRM measurement based on the reference signal resource at a moment beyond the sixth duration, improves measurement accuracy of the terminal device, and improves processing performance of the terminal device.

Based on content of setting the bits included in the first bit field by the network device, a specific implementation form of bits included in the sixth bit field may also be described in detail with reference to the three cases of the DCI in this embodiment of this application.

In addition, to ensure that the terminal device performs RRM measurement based on the reference signal resource in the time range in which the reference signal resource is used, the terminal device can negotiate with the network device in advance about a length of the sixth duration, or may determine a length of the sixth duration by configuring a list based on a correspondence between a range of the sixth duration and a number corresponding to a status of one or more bits in the sixth bit field.

When the DCI includes only the scheduling information, the bits included in the sixth bit field are the first to the eighth unused bits in the short messages field and at least one of the six unused most significant bits in the DCI.

For example, when determining that the two bits in the short message indicator field are set to "01", the network device may set the first bit in the short messages field to be a bit included in the sixth bit field. When the first bit in the short messages field is set to "1", the length of the sixth duration may be determined according to the list, and it indicates that the terminal device uses the reference signal resource in the sixth duration. When the first bit in the short messages field is set to "0", the length of the sixth duration may be determined according to the list, and it indicates that the terminal device uses the reference signal resource in the sixth duration.

Alternatively, when determining that the two bits in the short message indicator field are set to "01", the network device may set any two of the six most significant bits in the DCI to be bits included in the sixth bit field. When any two of the six most significant bits in the DCI are both set to "1", the length of the sixth duration may be determined according to the list, and it indicates that the terminal device uses the reference signal resource in the sixth duration.

When the DCI includes the short message, the bits included in the sixth bit field are the third to the eighth unused bits in the short messages field and at least one of the six unused most significant bits in the DCI.

For example, when determining that the two bits in the short message indicator field are set to "10" or "11", the network device may set the third bit in the short messages field to be a bit included in the sixth bit field. When the third bit in the short messages field is set to "1", the length of the sixth duration may be determined according to the list, and it indicates that the terminal device uses the reference signal resource in the sixth duration. When the third bit in the short messages field is set to "0", the length of the sixth duration may be determined according to the list, and it indicates that the terminal device uses the reference signal resource in the sixth duration.

Alternatively, when determining that the two bits in the short message indicator field are set to "10" or "11", the network device may set any two of the six most significant bits in the DCI to be bits included in the sixth bit field. When any two of the six most significant bits in the DCI are both set to "1", the length of the sixth duration may be determined according to the list, and it indicates that the terminal device uses the reference signal resource in the sixth duration.

When the two bits in the short message indicator field indicate the reserved state, a bit included in the sixth bit field is at least one of all the bits in the DCI other than the two bits.

For example, when determining that the two bits in the short message indicator field are set to "00", the network device may set the first bit in the short messages field to be a bit included in the sixth bit field. When the first bit in the short messages field is set to "1", the length of the sixth duration may be determined according to the list, and it indicates that the terminal device uses the reference signal resource in the sixth duration. When the first bit in the short messages field is set to "0", the length of the sixth duration may be determined according to the list, and it indicates that the terminal device uses the reference signal resource in the sixth duration.

Alternatively, when determining that the two bits in the short message indicator field are set to "00", the network device may set any two of the six most significant bits in the DCI to be bits included in the sixth bit field. When any two of the six most significant bits in the DCI are both set to "1", the length of the sixth duration may be determined according to the list, and it indicates that the terminal device uses the reference signal resource in the sixth duration.

It should be noted that, in this embodiment of this application, the bits included in the sixth bit field are not limited to the foregoing implementations, and the bits included in the sixth bit field may further include other bits. The sixth bit field may be included in the second message only when the second message includes the second bit field. Therefore, the network device may set the second bit field and the sixth bit field by using different bits. In addition, when the second message further includes at least one of the first bit field, the third bit field, the fourth bit field, and the fifth bit field, the network device further needs to ensure that the sixth bit field and the bit field are set by using different bits.

The sixth duration may be in a unit of an absolute time (for example, ms or s), a symbol, a slot, a subframe, a frame, or the like. In addition, a specific implementation form of the sixth duration is not limited in this embodiment of this application. Because the second bit field indicates that the terminal device uses the reference signal resource, to dynamically adjust the time range in which the reference signal resource is used, optionally, the sixth bit field may be further used to indicate a start moment of the sixth duration.

Generally, the start moment of the sixth duration may be a moment at which the terminal device receives a current second message. Alternatively, the start moment of the sixth duration may be a next paging moment at which the terminal device receives a current second message. This is not limited in this embodiment of this application.

When the sixth bit field indicates the start moment of the sixth duration, the terminal device may directly determine the start moment of the sixth duration based on the number corresponding to the status of the one or more bits in the sixth bit field, or the terminal device may pre-configure a list based on a correspondence between the status of the one or more bits in the sixth bit field and the start moment of the sixth duration, to determine the start moment of the sixth duration.

For example, when determining that the two bits in the short message indicator field are set to "01", the network device may set the first bit in the short messages field to be a bit included in the sixth bit field. When the first bit in the short messages field is set to "1", it indicates that the start moment of the sixth duration is the next paging moment at which the terminal device receives the current second message. When the first bit in the short messages field is set to "0", it indicates that the start moment of the sixth duration is the moment at which the terminal device receives the current second message.

Alternatively, the network device may set any two of the six most significant bits in the DCI to bits included in the sixth bit field. When any two of the six most significant bits in the DCI are all set to "1", it indicates that the start moment of the sixth duration is the next paging moment at which the terminal device receives the current second message. When any two of the six most significant bits in the DCI are set to "0", it indicates that the start moment of the sixth duration is the moment at which the terminal device receives the current second message.

Further, to help the terminal device set the sixth duration, optionally, the sixth duration may be q paging cycles of the second message, and q is a positive integer. A manner of configuring q is the same as the manner of configuring m.

When the sixth bit field indicates the sixth duration, namely, the quantity q, the terminal device may directly determine the quantity q based on the number corresponding to the status of the one or more bits in the sixth bit field, or the terminal device may pre-configure a list based on a correspondence between a value of q and the status of the one or more bits in the sixth bit field, to determine the quantity q.

For example, when determining that the two bits in the short message indicator field are set to "01", the network device may set the first bit in the short messages field to be a bit included in the sixth bit field. When the first bit in the short messages field is set to "0", it may indicate that q is 1, or it may be determined, according to the list, that q is 1, that is, the sixth duration is one paging cycle of the second message. When the first bit in the short messages field is set to "1", it may indicate that q is 2, or it may be determined, according to the list, that q is 2, that is, the sixth duration is two paging cycles of the second message.

Alternatively, the network device may set any two of the six most significant bits in the DCI to bits included in the sixth bit field. When any two of the six most significant bits in the DCI are both set to "0", it may indicate that q is 1, or it may be determined, according to the list, that q is 1, that is, the sixth duration is one paging cycle of the second message. When any two of the six most significant bits in the DCI are both set to "1", it may indicate that q is 4, or it may be determined, according to the list, that q is 4, that is, the sixth duration is four paging cycles of the second message.

In addition, when the sixth bit field indicates both the start moment of the sixth duration and the quantity q, the terminal device may determine the start moment of the sixth duration and the quantity q based on the number corresponding to the status of the one or more bits in the sixth bit field, may separately determine the start moment of the sixth duration and the quantity n based on a number corresponding to a status of each of a plurality of bits in the sixth bit field, or may determine the start moment of the sixth duration and the quantity q by pre-configuring a list based on a correspondence between a value of q and the status of the one or more bits in the sixth bit field.

For example, when determining that the two bits in the short message indicator field are set to "01", the network device may set the first bit in the short messages field to be a bit included in the sixth bit field. When the first bit in the short messages field is set to "0", it indicates that the start moment of the sixth duration is the moment at which the terminal device receives the current second message, and it may indicate that q is 1, or it may be determined, according to the list, that q is 1, that is, the sixth duration is one paging cycle of the second message. When the first bit in the short messages field is set to "1", it indicates that the start moment of the sixth duration is the next paging moment at which the terminal device receives the current second message, and it may indicate that q is 2, or it may be determined, according to the list, that q is 2, that is, the sixth duration is two paging cycles of the second message.

Alternatively, the network device may set any two of the six most significant bits in the DCI to bits included in the sixth bit field. When any two of the six most significant bits in the DCI are both set to "0", it indicates that the start moment of the sixth duration is the moment at which the terminal device receives the current second message, and it may indicate that q is 1, or it may be determined, according to the list, that q is 1, that is, the sixth duration is one paging cycle of the second message. When any two of the six most significant bits in the DCI are both set to "1", it indicates that the start moment of the sixth duration is the next paging moment at which the terminal device receives the current second message, and it may indicate that q is 4, or it may be determined, according to the list, that q is 4, that is, the sixth duration is four paging cycles of the second message. In addition, the terminal device may determine the start moment of the sixth duration based on one of the two bits, and determine the quantity q based on the other bit. Refer to the foregoing process.

It should be noted that in the foregoing two feasible implementations, the fifth duration and the sixth duration may be the same or may be different. This is not limited in this embodiment of this application.

In another feasible implementation, in addition to the configuration information of the reference signal resource, the first message may further include fourth information. The fourth information is used to indicate seventh duration, and the fourth information is used to indicate that the terminal device uses the reference signal resource in seventh duration in each paging cycle of the second message. Therefore, when the terminal device receives the second message that includes the second bit field and that is sent by the network device, and the second bit field is used to indicate that the reference signal resource is used, the terminal device may determine, based on the fourth information, that the reference signal resource is used in the seventh duration in each paging cycle of the second message, and the terminal device determines that the reference signal resource is not used beyond the seventh duration. In this way, the terminal device can be prevented from performing RRM measurement on the reference signal resource when the reference signal resource is unavailable. In addition, the network device may configure the seventh duration to be near the paging moment of the terminal device. In this way, when waking up to monitor a PDCCH on the PO, the terminal device can use the reference signal resource to perform a specific operation, for example, RRM measurement. This avoids a problem that power consumption is wasted because the terminal device wakes up for a plurality of times at a moment far away from the PO to merely use the reference signal resource, to reduce power consumption of the terminal device and improve processing performance of the terminal device.

In this embodiment of this application, to ensure that the terminal device performs RRM measurement based on the reference signal resource in the time range in which the reference signal resource is used, the terminal device can negotiate with the network device in advance about a length of the seventh duration, for example, a default value, or may determine a length of the seventh duration based on the fourth information, for example, a number or an identifier at each fixed position in the fourth information. This is not limited in this embodiment of this application.

For example, if the number at the fixed position in the fourth information is 1, the seventh duration is 20 milliseconds. If the number at the fixed position in the fourth information is a, the seventh duration is 20 milliseconds.

The seventh duration may be in a unit of an absolute time (for example, ms or s), a symbol, a slot, a subframe, a frame, or the like. In addition, a specific implementation form of the seventh duration is not limited in this embodiment of this application. Because the second bit field indicates that the terminal device uses the reference signal resource, to dynamically adjust the time range in which the reference signal resource is used, optionally, the fourth information may be further used to indicate a start moment or an end moment of the seventh duration.

Generally, the start moment or the end moment of the seventh duration may be any paging moment of the terminal device. For a manner of configuring the seventh duration, refer to the manner of configuring the third duration in FIG. 3a and FIG. 3b. Alternatively, the start moment or the end moment of the seventh duration may be a closest moment at which the network device sends the SSB signal resource and that is before or after any paging moment of the terminal device. For a manner of configuring the seventh duration, refer to the manner of configuring the third duration in FIG. 3c and FIG. 3d. This is not limited in this embodiment of this application.

In another feasible implementation, the second message may further include a seventh bit field. The seventh bit field is used to indicate eighth duration, and the seventh bit field is used to indicate that the terminal device uses the reference signal resource in eighth duration in each paging cycle of the second message. Therefore, when the terminal device receives the second message that includes the second bit field and that is sent by the network device, and the second bit field is used to indicate that the reference signal resource is used, the terminal device may determine, based on the seventh bit field, that the reference signal resource is used in the eighth duration in each paging cycle of the second message, and the terminal device determines that the reference signal resource is not used beyond the eighth duration. In this way, the terminal device can be prevented from performing RRM measurement on the reference signal resource when the reference signal resource is unavailable. In addition, the network device may configure the eighth duration to be near the paging moment of the terminal device. In this way, when waking up to monitor a PDCCH on the PO, the terminal device can use the reference signal resource to perform a specific operation, for example, RRM measurement. This avoids a problem that power consumption is wasted because the terminal device wakes up for a plurality of times at a moment far away from the PO to merely use the reference signal resource, to reduce power consumption of the terminal device and improve processing performance of the terminal device.

A position of the seventh bit field in the second message is not limited in this embodiment of this application. When the second message is a paging message, optionally, the seventh bit field is in the DCI in the paging message. Specifically, the DCI in the paging message is carried on the PDCCH scrambled based on the P-RNTI. The terminal device may demodulate the DCI that is on the PDCCH, to search the DCI in the paging message for the seventh bit field. Therefore, the terminal device can accurately determine, based on the seventh bit field, that the reference signal resource is used in the eighth duration in each paging cycle of the terminal device. This avoids an unnecessary operation caused by performing, by the terminal device, RRM measurement based on the reference signal resource at a moment beyond the eighth duration, improves measurement accuracy of the terminal device, and improves processing performance of the terminal device.

Based on content of setting the bits included in the first bit field by the network device, a specific implementation form of bits included in the seventh bit field may also be described in detail with reference to the three cases of the DCI in this embodiment of this application.

In addition, to ensure that the terminal device performs RRM measurement based on the reference signal resource in the time range in which the reference signal resource is used, the terminal device can negotiate with the network device in advance about a length of the eighth duration, or may determine a length of the eighth duration by configuring a list based on a correspondence between a range of the eighth duration and a number corresponding to a status of one or more bits in the seventh bit field.

When the DCI includes only the scheduling information, the bits included in the seventh bit field are the first to the eighth unused bits in the short messages field and at least one of the six unused most significant bits in the DCI.

For example, when determining that the two bits in the short message indicator field are set to "01", the network device may set the first bit in the short messages field to be a bit included in the seventh bit field. When the first bit in the short messages field is set to "1", the length of the eighth duration may be determined according to the list, and it indicates that the terminal device uses the reference signal resource in the eighth duration in each paging cycle of the second message. When the first bit in the short messages field is set to "0", the length of the eighth duration may be determined according to the list, and it indicates that the terminal device uses the reference signal resource in the eighth duration in each paging cycle of the second message.

Alternatively, when determining that the two bits in the short message indicator field are set to "01", the network device may set any two of the six most significant bits in the DCI to be bits included in the seventh bit field. When any two of the six most significant bits in the DCI are both set to "1", the length of the eighth duration may be determined according to the list, and it indicates that the terminal device uses the reference signal resource in the eighth duration in each paging cycle of the second message.

When the DCI includes the short message, the bits included in the seventh bit field are the third to the eighth unused bits in the short messages field and at least one of the six unused most significant bits in the DCI.

For example, when determining that the two bits in the short message indicator field are set to "10" or "11", the network device may set the third bit in the short messages field to be a bit included in the seventh bit field. When the third bit in the short messages field is set to "1", the length of the eighth duration may be determined according to the list, and it indicates that the terminal device uses the reference signal resource in the eighth duration in each paging cycle of the second message. When the third bit in the short messages field is set to "0", the length of the eighth duration may be determined according to the list, and it indicates that the terminal device uses the reference signal resource in the eighth duration in each paging cycle of the second message.

Alternatively, when determining that the two bits in the short message indicator field are set to "10" or "11", the network device may set any two of the six most significant bits in the DCI to be bits included in the seventh bit field. When any two of the six most significant bits in the DCI are both set to "1", the length of the eighth duration may be determined according to the list, and it indicates that the terminal device uses the reference signal resource in the eighth duration in each paging cycle of the second message.

When the two bits in the short message indicator field indicate the reserved state, a bit included in the seventh bit field is at least one of all the bits in the DCI other than the two bits.

For example, when determining that the two bits in the short message indicator field are set to "00", the network device may set the first bit in the short messages field to be a bit included in the seventh bit field. When the first bit in the short messages field is set to "1", the length of the eighth duration may be determined according to the list, and it indicates that the terminal device uses the reference signal resource in the eighth duration in each paging cycle of the second message. When the first bit in the short messages field is set to "0", the length of the eighth duration may be determined according to the list, and it indicates that the terminal device uses the reference signal resource in the eighth duration in each paging cycle of the second message.

Alternatively, when determining that the two bits in the short message indicator field are set to "00", the network device may set any two of the six most significant bits in the DCI to be bits included in the seventh bit field. When any two of the six most significant bits in the DCI are both set to "1", the length of the eighth duration may be determined according to the list, and it indicates that the terminal device uses the reference signal resource in the eighth duration in each paging cycle of the second message.

It should be noted that, in this embodiment of this application, the bits included in the seventh bit field are not limited to the foregoing implementations, and the bits included in the seventh bit field may further include other bits. The seventh bit field may be included in the second message only when the second message includes the second bit field. Therefore, the network device may set the second bit field and the seventh bit field by using different bits. In addition, when the second message further includes at least one of the first bit field, the third bit field, the fourth bit field, the fifth bit field, and the sixth bit field, the network device further to ensure that the seventh bit field and the bit field are set by using different bits.

The eighth duration may be in a unit of an absolute time (for example, ms or s), a symbol, a slot, a subframe, a frame, or the like. In addition, a specific implementation form of the eighth duration is not limited in this embodiment of this application. Because the second bit field indicates that the terminal device uses the reference signal resource, to dynamically adjust the time range in which the reference signal resource is used, optionally, the seventh bit field may be further used to indicate a start moment or an end moment of the eighth duration.

Generally, the start moment or the end moment of the eighth duration may be any paging moment of the terminal device. For a manner of configuring the eighth duration, refer to the manner of configuring the third duration in FIG. 3a and FIG. 3b. Alternatively, the start moment or the end moment of the eighth duration may be a closest moment at which the network device sends the existing SSB signal resource and that is before or after any paging moment of the terminal device. For a manner of configuring the eighth duration, refer to the manner of configuring the third duration in FIG. 3c and FIG. 3d. This is not limited in this embodiment of this application.

When the seventh bit field indicates the start moment or the end moment of the eighth duration, the terminal device may directly determine the start moment or the end moment of the eighth duration based on the number corresponding to the status of the one or more bits in the seventh bit field, or the terminal device may pre-configure a list based on a correspondence between the status of the one or more bits in the seventh bit field and the start moment or the end moment of the eighth duration, to determine the start moment or the end moment of the eighth duration.

For example, when determining that the two bits in the short message indicator field are set to "01", the network device may set the first bit in the short messages field to be a bit included in the seventh bit field. When the first bit in the short messages field is set to "1", it indicates that the start moment of the eighth duration is a closest moment at which the network device sends the existing SSB signal resource and that is before any paging moment of the terminal device. When the first bit in the short messages field is set to "0", it indicates that the end moment of the eighth duration is any paging moment of the terminal device.

Alternatively, the network device may set any two of the six most significant bits in the DCI to bits included in the seventh bit field. When any two of the six most significant bits in the DCI are both set to "1", it indicates that the end moment of the eighth duration is a closest moment at which the network device sends the existing SSB signal resource and that is after any paging moment of the terminal device. When any two of the six most significant bits in the DCI are both set to "0", it indicates that the start moment of the eighth duration is any paging moment of the terminal device.

It should be noted that in the foregoing two feasible implementations, the seventh duration and the eighth duration may be the same or may be different. This is not limited in this embodiment of this application.

Further, based on the foregoing four feasible implementations, when the terminal device learns of at least two of the fifth duration, the sixth duration, the seventh duration, and the eighth duration, the reference signal resource is usually used in overlapping duration of the at least two durations. For example, when the terminal device learns of the fifth duration and the seventh duration, the reference signal resource is usually used in overlapping duration of the fifth duration and the seventh duration.

Further, the network device may dynamically adjust, by using the first message and/or the second message, a time range in which the reference signal resource is used, so that the terminal device can determine the time range in which the reference signal resource is used, and the terminal device can properly select the reference signal resource to perform RRM measurement. Therefore, the terminal device is prevented from performing RRM measurement when the reference signal resource is unavailable, thereby implementing an accurate operation performed by the terminal device, and further improving the processing performance of the terminal device.

It may be understood that in the foregoing method embodiments, an operation performed by the network device may alternatively be implemented by a component (for example, a chip or a circuit) that may be used in the network device, and an operation performed by the terminal device may alternatively be implemented by a component (for example, a chip or a circuit) that may be used in the terminal device.

Figure 5:
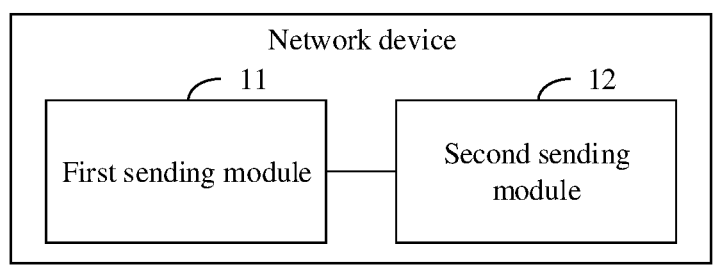
FIG. 5 is an example schematic structural diagram of an embodiment of a network device according to this application.

FIG. 5 is a schematic structural diagram of an embodiment of a network device according to this application. The network device may alternatively be a component (for example, a chip or a circuit) that may be used in the network device. As shown in FIG. 5, the network device in this embodiment of this application may include:

a first sending module 11, configured to send a first message to a terminal device, where the first message includes configuration information of a reference signal resource; and a second sending module 12, configured to send a second message to the terminal device, where the second message includes a first bit field and/or a second bit field, the first bit field is used to indicate an availability status of the reference signal resource, and the second bit field is used to indicate that the terminal device uses a synchronization signal/physical broadcast channel resource block signal resource and/or the reference signal resource.

In some embodiments, the first bit field is in downlink control information in the second message.

In some embodiments, when the DCI includes only scheduling information, bits included in the first bit field are at least one of the first to the eighth unused bits in a short messages field and six unused most significant bits in the DCI; when the DCI includes a short message, bits included in the first bit field are at least one of the third to the eighth unused bits in a short messages field and six unused most significant bits in the DCI; or when two bits in a short message indicator field indicate a reserved state, a bit included in the first bit field is at least one of all bits in the DCI other than the two bits.

In some embodiments, the second bit field is in downlink control information in the second message.

In some embodiments, when the DCI includes only scheduling information, bits included in the second bit field are at least one of the first to the eighth unused bits in a short messages field and six unused most significant bits in the DCI; when the DCI includes a short message, bits included in the second bit field are at least one of the third to the eighth unused bits in a short messages field and six unused most significant bits in the DCI; or when two bits in a short message indicator field indicate a reserved state, a bit included in the second bit field is at least one of all bits in the DCI other than the two bits.

In some embodiments, the reference signal resource includes at least one of the following resources: a channel state information reference signal resource, a newly added synchronization signal/physical broadcast channel resource block signal resource, and a secondary synchronization signal resource.

In some embodiments, the second message further includes a third bit field, and the third bit field is used to indicate whether configuration information of a reference signal resource in a current first message is different from configuration information of a reference signal resource in a previous first message, or the third bit field is used to indicate whether a system information block that is in a current first message and that carries configuration information of a reference signal resource is different from a system information block that is in a previous first message already obtained by the terminal device and that carries configuration information of a reference signal resource.

In some embodiments, the third bit field is in downlink control information in the second message.

In some embodiments, when the DCI includes only scheduling information, bits included in the third bit field are at least one of the first to the eighth unused bits in a short messages field and six unused most significant bits in the DCI; when the DCI includes the short message, bits included in the third bit field are the third to the eighth unused bits in the short messages field and at least one of the six unused most significant bits in the DCI; or when two bits in the short message indicator field indicate a reserved state, a bit included in the third bit field is at least one of all the bits in the DCI other than the two bits.

In some embodiments, when the second message includes the first bit field, and the first bit field indicates that the reference signal resource is available, the first message further includes first information, where the first information is used to indicate first duration, and the first information is used to indicate that the reference signal resource is available in the first duration.

In some embodiments, the first information is further used to indicate a start moment of the first duration; and the start moment of the first duration is a moment at which the terminal device receives a current second message, or the start moment of the first duration is a next paging moment at which the terminal device receives a current second message.

In some embodiments, the first duration is m paging cycles of the second message, and m is a positive integer.

In some embodiments, when the second message includes the first bit field, and the first bit field indicates that the reference signal resource is available, the second message further includes a fourth bit field, where the fourth bit field is used to indicate second duration, and the fourth bit field is used to indicate that the reference signal resource is available in the second duration.

In some embodiments, the fourth bit field is further used to indicate a start moment of the second duration; and the start moment of the second duration is a moment at which the terminal device receives a current second message, or the start moment of the second duration is a next paging moment at which the terminal device receives a current second message.

In some embodiments, the second duration is n paging cycles of the second message, and n is a positive integer.

In some embodiments, the fourth bit field is in downlink control information in the second message.

In some embodiments, when the DCI includes only the scheduling information, bits included in the fourth bit field are the first to the eighth unused bits in the short messages field and at least one of the six unused most significant bits in the DCI; when the DCI includes the short message, bits included in the fourth bit field are the third to the eighth unused bits in the short messages field and at least one of the six unused most significant bits in the DCI; or when two bits in the short message indicator field indicate a reserved state, a bit included in the fourth bit field is at least one of all the bits in the DCI other than the two bits.

In some embodiments, when the second message includes the first bit field, and the first bit field indicates that the reference signal resource is available, the first message further includes second information, where the second information is used to indicate third duration, and the second information is used to indicate that the reference signal resource is available in the third duration in each paging cycle of the second message.

In some embodiments, the second information is further used to indicate a start moment or an end moment of the third duration; and the start moment or the end moment of the third duration is any paging moment of the terminal device; or the start moment or the end moment of the third duration is a closest moment at which the network device sends the synchronization signal/physical broadcast channel resource block signal resource and that is before or after any paging moment of the terminal device.

In some embodiments, when the second message includes the first bit field, and the first bit field indicates that the reference signal resource is available, the second message further includes a fifth bit field, where the fifth bit field is used to indicate fourth duration, and the fifth bit field is used to indicate that the reference signal resource is available in the fourth duration in each paging cycle of the second message.

In some embodiments, the fifth bit field is further used to indicate a start moment or an end moment of the fourth duration; and the start moment or the end moment of the fourth duration is any paging moment of the terminal device; or the start moment or the end moment of the fourth duration is a closest moment at which the network device sends the synchronization signal/physical broadcast channel resource block signal resource and that is before or after any paging moment of the terminal device.

In some embodiments, the fifth bit field is in downlink control information in the second message.

In some embodiments, when the DCI includes only the scheduling information, bits included in the fifth bit field are the first to the eighth unused bits in the short messages field and at least one of the six unused most significant bits in the DCI; when the DCI includes the short message, bits included in the fifth bit field are the third to the eighth unused bits in the short messages field and at least one of the six unused most significant bits in the DCI; or when two bits in the short message indicator field indicate a reserved state, a bit included in the fifth bit field is at least one of all the bits in the DCI other than the two bits.

In some embodiments, when the second message includes only the second bit field, and the second bit field indicates that the terminal device uses the reference signal resource, the first message further includes third information, where the third information is used to indicate fifth duration, and the third information is used to indicate that the terminal device uses the reference signal resource in the fifth duration.

In some embodiments, the third information is further used to indicate a start moment of the fifth duration; and the start moment of the fifth duration is a moment at which the terminal device receives a current second message, or the start moment of the fifth duration is a next paging moment at which the terminal device receives a current second message.

In some embodiments, the fifth duration is p paging cycles of the second message, and p is a positive integer.

In some embodiments, when the second message includes only the second bit field, and the second bit field indicates that the terminal device uses the reference signal resource, the second message further includes a sixth bit field, where the sixth bit field is used to indicate sixth duration, and the sixth bit field is used to indicate that the terminal device uses the reference signal resource in the sixth duration.

In some embodiments, the sixth bit field is further used to indicate a start moment of the sixth duration; and the start moment of the sixth duration is a moment at which the terminal device receives a current second message, or the start moment of the sixth duration is a next paging moment at which the terminal device receives a current second message.

In some embodiments, the sixth duration is q paging cycles of the second message, and q is a positive integer.

In some embodiments, the sixth bit field is in downlink control information in the second message.

In some embodiments, when the DCI includes only the scheduling information, bits included in the sixth bit field are the first to the eighth unused bits in the short messages field and at least one of the six unused most significant bits in the DCI; when the DCI includes the short message, bits included in the sixth bit field are the third to the eighth unused bits in the short messages field and at least one of the six unused most significant bits in the DCI; or when two bits in the short message indicator field indicate a reserved state, a bit included in the sixth bit field is at least one of all the bits in the DCI other than the two bits.

In some embodiments, when the second message includes only the second bit field, and the second bit field indicates that the terminal device uses the reference signal resource, the first message further includes fourth information, where the fourth information is used to indicate seventh duration, and the fourth information is used to indicate that the terminal device uses the reference signal resource in the seventh duration in each paging cycle of the second message.

In some embodiments, the fourth information is further used to indicate a start moment or an end moment of the seventh duration; and the start moment or the end moment of the seventh duration is any paging moment of the terminal device; or the start moment or the end moment of the seventh duration is a closest moment at which the network device sends the SSB signal resource and that is before or after any paging moment of the terminal device.

In some embodiments, when the second message includes only the second bit field, and the second bit field indicates that the terminal device uses the reference signal resource, the second message further includes a seventh bit field, where the seventh bit field is used to indicate eighth duration, and the seventh bit field is used to indicate that the terminal device uses the reference signal resource in the eighth duration in each paging cycle of the second message.

In some embodiments, the seventh bit field is further used to indicate a start moment or an end moment of the eighth duration; and the start moment or the end moment of the eighth duration is any paging moment of the terminal device; or the start moment or the end moment of the eighth duration is a closest moment at which the network device sends the SSB signal resource and that is before or after any paging moment of the terminal device.

In some embodiments, the seventh bit field is in downlink control information in the second message.

In some embodiments, when the DCI includes only the scheduling information, bits included in the seventh bit field are the first to the eighth unused bits in the short messages field and at least one of the six unused most significant bits in the DCI; when the DCI includes the short message, bits included in the seventh bit field are the third to the eighth unused bits in the short messages field and at least one of the six unused most significant bits in the DCI; or when two bits in the short message indicator field indicate a reserved state, a bit included in the seventh bit field is at least one of all the bits in the DCI other than the two bits.

The network device in this embodiment may be configured to perform the technical solution in the method embodiment shown in FIG. 2 to FIG. 4, and implementation principles and technical effects thereof are similar. For an operation implemented by each module, refer to related descriptions in the method embodiment. The module herein may alternatively be replaced with a component or a circuit.

Figure 6:
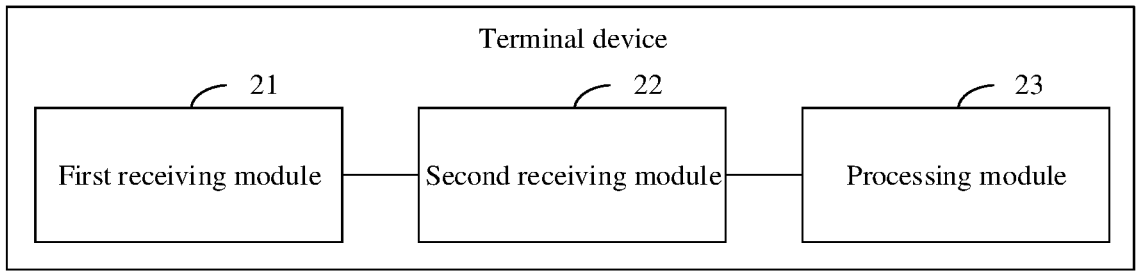
FIG. 6 is an example schematic structural diagram of an embodiment of a terminal device according to this application.

FIG. 6 is a schematic structural diagram of an embodiment of a terminal device according to this application. The terminal device may alternatively be a component (for example, a chip or a circuit) that may be used in the terminal device. As shown in FIG. 6, the terminal device in this embodiment of this application may include:

a first receiving module 21, configured to receive a first message from a network device, where the first message includes configuration information of a reference signal resource; a second receiving module 22, configured to receive a second message from the network device, where the second message includes a first bit field and/or a second bit field, the first bit field is used to indicate an availability status of the reference signal resource, and the second bit field is used to indicate that the terminal device uses a synchronization signal/physical broadcast channel resource block signal resource and/or the reference signal resource; and a processing module 23, configured to perform radio resource management measurement based on the first message and the second message.

In some embodiments, the first bit field is in downlink control information in the second message.

In some embodiments, when the DCI includes only scheduling information, bits included in the first bit field are at least one of the first to the eighth unused bits in a short messages field and six unused most significant bits in the DCI; when the DCI includes a short message, bits included in the first bit field are at least one of the third to the eighth unused bits in a short messages field and six unused most significant bits in the DCI; or when two bits in a short message indicator field indicate a reserved state, a bit included in the first bit field is at least one of all bits in the DCI other than the two bits.

In some embodiments, the second bit field is in downlink control information in the second message.

In some embodiments, when the DCI includes only scheduling information, bits included in the second bit field are at least one of the first to the eighth unused bits in a short messages field and six unused most significant bits in the DCI; when the DCI includes a short message, bits included in the second bit field are at least one of the third to the eighth unused bits in a short messages field and six unused most significant bits in the DCI; or when two bits in a short message indicator field indicate a reserved state, a bit included in the second bit field is at least one of all bits in the DCI other than the two bits.

In some embodiments, the reference signal resource includes at least one of the following resources: a channel state information reference signal resource, a newly added synchronization signal/physical broadcast channel resource block signal resource, and a secondary synchronization signal resource.

In some embodiments, the second message further includes a third bit field, and the third bit field is used to indicate whether configuration information of a reference signal resource in a current first message is different from configuration information of a reference signal resource in a previous first message, or the third bit field is used to indicate whether a system information block that is in a current first message and that carries configuration information of a reference signal resource is different from a system information block that is in a previous first message already obtained by the terminal device and that carries configuration information of a reference signal resource.

In some embodiments, the third bit field is in downlink control information in the second message.

In some embodiments, when the DCI includes only scheduling information, bits included in the third bit field are at least one of the first to the eighth unused bits in a short messages field and six unused most significant bits in the DCI; when the DCI includes the short message, bits included in the third bit field are the third to the eighth unused bits in the short messages field and at least one of the six unused most significant bits in the DCI; or when two bits in the short message indicator field indicate a reserved state, a bit included in the third bit field is at least one of all the bits in the DCI other than the two bits.

In some embodiments, when the second message includes the first bit field, and the first bit field indicates that the reference signal resource is available, the first message further includes first information, where the first information is used to indicate first duration, and the first information is used to indicate that the reference signal resource is available in the first duration.

In some embodiments, the first information is further used to indicate a start moment of the first duration; and the start moment of the first duration is a moment at which the terminal device receives a current second message, or the start moment of the first duration is a next paging moment at which the terminal device receives a current second message.

In some embodiments, the first duration is m paging cycles of the second message, and m is a positive integer.

In some embodiments, when the second message includes the first bit field, and the first bit field indicates that the reference signal resource is available, the second message further includes a fourth bit field, where the fourth bit field is used to indicate second duration, and the fourth bit field is used to indicate that the reference signal resource is available in the second duration.

In some embodiments, the fourth bit field is further used to indicate a start moment of the second duration; and the start moment of the second duration is a moment at which the terminal device receives a current second message, or the start moment of the second duration is a next paging moment at which the terminal device receives a current second message.

In some embodiments, the second duration is n paging cycles of the second message, and n is a positive integer.

In some embodiments, the fourth bit field is in downlink control information in the second message.

In some embodiments, when the DCI includes only the scheduling information, bits included in the fourth bit field are the first to the eighth unused bits in the short messages field and at least one of the six unused most significant bits in the DCI; when the DCI includes the short message, bits included in the fourth bit field are the third to the eighth unused bits in the short messages field and at least one of the six unused most significant bits in the DCI; or when two bits in the short message indicator field indicate a reserved state, a bit included in the fourth bit field is at least one of all the bits in the DCI other than the two bits.

In some embodiments, when the second message includes the first bit field, and the first bit field indicates that the reference signal resource is available, the first message further includes second information, where the second information is used to indicate third duration, and the second information is used to indicate that the reference signal resource is available in the third duration in each paging cycle of the second message.

In some embodiments, the second information is further used to indicate a start moment or an end moment of the third duration; and the start moment or the end moment of the third duration is any paging moment of the terminal device; or the start moment or the end moment of the third duration is a closest moment at which the network device sends the synchronization signal/physical broadcast channel resource block signal resource and that is before or after any paging moment of the terminal device.

In some embodiments, when the second message includes the first bit field, and the first bit field indicates that the reference signal resource is available, the second message further includes a fifth bit field, where the fifth bit field is used to indicate fourth duration, and the fifth bit field is used to indicate that the reference signal resource is available in the fourth duration in each paging cycle of the second message.

In some embodiments, the fifth bit field is further used to indicate a start moment or an end moment of the fourth duration; and the start moment or the end moment of the fourth duration is any paging moment of the terminal device; or the start moment or the end moment of the fourth duration is a closest moment at which the network device sends the synchronization signal/physical broadcast channel resource block signal resource and that is before or after any paging moment of the terminal device.

In some embodiments, the fifth bit field is in downlink control information in the second message.

In some embodiments, when the DCI includes only the scheduling information, bits included in the fifth bit field are the first to the eighth unused bits in the short messages field and at least one of the six unused most significant bits in the DCI; when the DCI includes the short message, bits included in the fifth bit field are the third to the eighth unused bits in the short messages field and at least one of the six unused most significant bits in the DCI; or when two bits in the short message indicator field indicate a reserved state, a bit included in the fifth bit field is at least one of all the bits in the DCI other than the two bits.

In some embodiments, when the second message includes only the second bit field, and the second bit field indicates that the terminal device uses the reference signal resource, the first message further includes third information, where the third information is used to indicate fifth duration, and the third information is used to indicate that the terminal device uses the reference signal resource in the fifth duration.

In some embodiments, the third information is further used to indicate a start moment of the fifth duration; and the start moment of the fifth duration is a moment at which the terminal device receives a current second message, or the start moment of the fifth duration is a next paging moment at which the terminal device receives a current second message.

In some embodiments, the fifth duration is p paging cycles of the second message, and p is a positive integer.

In some embodiments, when the second message includes only the second bit field, and the second bit field indicates that the terminal device uses the reference signal resource, the second message further includes a sixth bit field, where the sixth bit field is used to indicate sixth duration, and the sixth bit field is used to indicate that the terminal device uses the reference signal resource in the sixth duration.

In some embodiments, the sixth bit field is further used to indicate a start moment of the sixth duration; and the start moment of the sixth duration is a moment at which the terminal device receives a current second message, or the start moment of the sixth duration is a next paging moment at which the terminal device receives a current second message.

In some embodiments, the sixth duration is q paging cycles of the second message, and q is a positive integer.

In some embodiments, the sixth bit field is in downlink control information in the second message.

In some embodiments, when the DCI includes only the scheduling information, bits included in the sixth bit field are the first to the eighth unused bits in the short messages field and at least one of the six unused most significant bits in the DCI; when the DCI includes the short message, bits included in the sixth bit field are the third to the eighth unused bits in the short messages field and at least one of the six unused most significant bits in the DCI; or when two bits in the short message indicator field indicate a reserved state, a bit included in the sixth bit field is at least one of all the bits in the DCI other than the two bits.

In some embodiments, when the second message includes only the second bit field, and the second bit field indicates that the terminal device uses the reference signal resource, the first message further includes fourth information, where the fourth information is used to indicate seventh duration, and the fourth information is used to indicate that the terminal device uses the reference signal resource in the seventh duration in each paging cycle of the second message.

In some embodiments, the fourth information is further used to indicate a start moment or an end moment of the seventh duration; and the start moment or the end moment of the seventh duration is any paging moment of the terminal device; or the start moment or the end moment of the seventh duration is a closest moment at which the network device sends the SSB signal resource and that is before or after any paging moment of the terminal device.

In some embodiments, when the second message includes only the second bit field, and the second bit field indicates that the terminal device uses the reference signal resource, the second message further includes a seventh bit field, where the seventh bit field is used to indicate eighth duration, and the seventh bit field is used to indicate that the terminal device uses the reference signal resource in the eighth duration in each paging cycle of the second message.

In some embodiments, the seventh bit field is further used to indicate a start moment or an end moment of the eighth duration; and the start moment or the end moment of the eighth duration is any paging moment of the terminal device; or the start moment or the end moment of the eighth duration is a closest moment at which the network device sends the SSB signal resource and that is before or after any paging moment of the terminal device.

In some embodiments, the seventh bit field is in downlink control information in the second message.

In some embodiments, when the DCI includes only the scheduling information, bits included in the seventh bit field are the first to the eighth unused bits in the short messages field and at least one of the six unused most significant bits in the DCI; when the DCI includes the short message, bits included in the seventh bit field are the third to the eighth unused bits in the short messages field and at least one of the six unused most significant bits in the DCI; or when two bits in the short message indicator field indicate a reserved state, a bit included in the seventh bit field is at least one of all the bits in the DCI other than the two bits.

The terminal device in this embodiment may be configured to perform the technical solution in the method embodiment shown in FIG. 2 to FIG. 4, and implementation principles and technical effects thereof are similar. For an operation implemented by each module, refer to related descriptions in the method embodiment. The module herein may alternatively be replaced with a component or a circuit.

In this application, functional modules of the network device or the terminal device may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, another division manner may be used.

Figure 7:
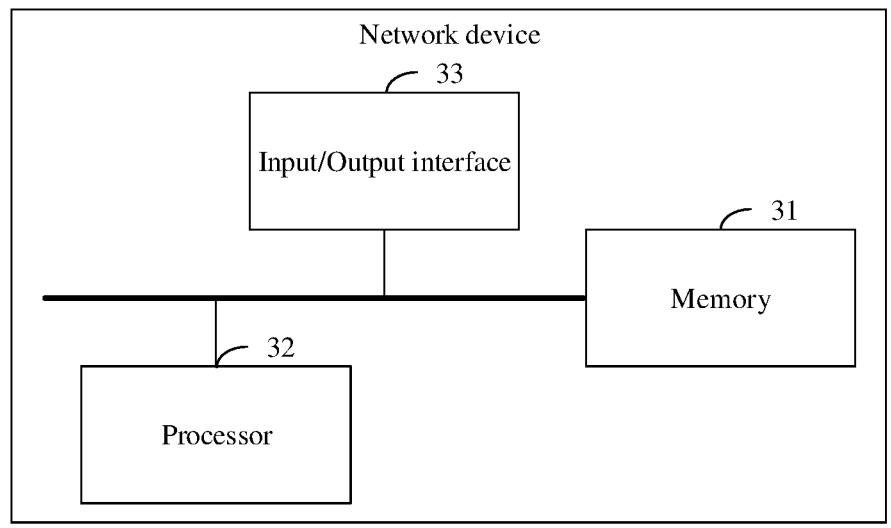
FIG. 7 is an example schematic structural diagram of an embodiment of a network device according to this application.

FIG. 7 is a schematic structural diagram of an embodiment of a network device according to this application. The network device includes:

a memory 31, configured to store program instructions, where the memory 31 may be a flash (e.g., flash memory); and a processor 32, configured to invoke and execute the program instructions in the memory 31, to implement steps corresponding to the network device in the communication method in FIG. 2 to FIG. 4. For details, refer to the related descriptions in the foregoing method embodiments.

The network device may further include an input/output interface 33. The input/output interface 33 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The network device may be configured to perform the steps and/or procedures corresponding to the network device in the foregoing method embodiments.

Figure 8:
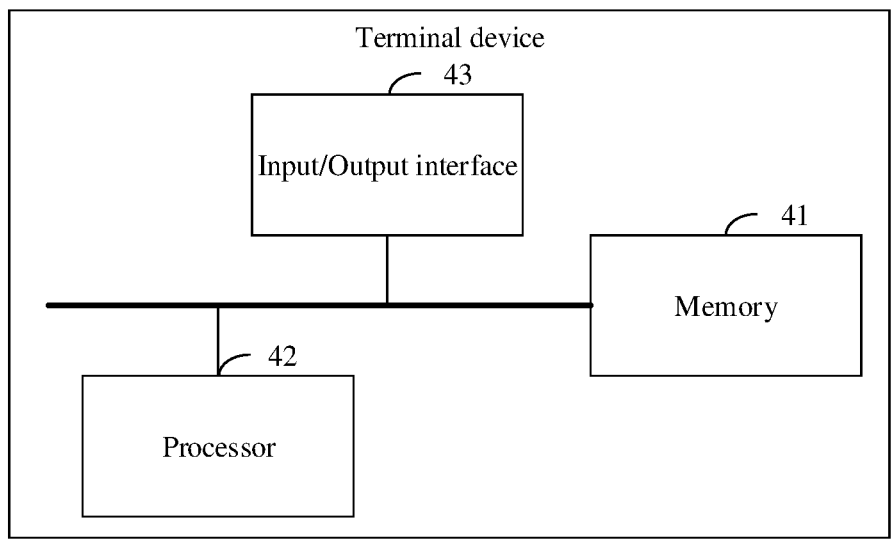
FIG. 8 is an example schematic structural diagram of an embodiment of a terminal device according to this application.

FIG. 8 is a schematic structural diagram of an embodiment of a terminal device according to this application. The terminal device includes: a memory 41, configured to store program instructions, where the memory 41 may be a flash (e.g., flash memory); and a processor 42, configured to invoke and execute the program instructions in the memory 41, to implement steps corresponding to the terminal device in the communication method in FIG. 2 to FIG. 4. For details, refer to the related descriptions in the foregoing method embodiments.

The terminal device may further include an input/output interface 43. The input/output interface 43 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The terminal device may be configured to perform the steps and/or procedures corresponding to the terminal device in the foregoing method embodiments.

This application further provides a readable storage medium. The readable storage medium stores executable instructions. When at least one processor of a network device executes the executable instructions, the network device performs the communication method in the foregoing method embodiments.

This application further provides a readable storage medium. The readable storage medium stores executable instructions. When at least one processor of a terminal device executes the executable instructions, the terminal device performs the communication method in the foregoing method embodiments.

This application further provides a program product. The program product includes executable instructions, and the executable instructions are stored in a readable storage medium. At least one processor of a network device may read the executable instructions in the readable storage medium, and the at least one processor executes the executable instructions, so that the network device implements the communication method in the foregoing method embodiments.

This application further provides a program product. The program product includes executable instructions, and the executable instructions are stored in a readable storage medium. At least one processor of a terminal device may read the executable instructions in the readable storage medium, and the at least one processor executes the executable instructions, so that the terminal device implements the communication method in the foregoing method embodiments.

This application further provides a chip. The chip is connected to a memory, or a memory is integrated into the chip. When a software program stored in the memory is executed, the communication method in the foregoing method embodiments is implemented.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disk (DVD)), a semiconductor medium (for example, a solid state drive (SSD)), or the like.

What is claimed is:

1. A communication method, comprising:
receiving a first message from a network device, wherein the first message includes configuration information of a reference signal resource;
receiving a second message from the network device, wherein
the second message includes a first bit field, and
the first bit field indicates an availability status of the reference signal resource; and
performing radio resource management (RRM) measurement, beam management (BM), and/or time-frequency tracking based on the first message and the second message.

2. The method according to claim 1, wherein
the second message comprises downlink control information (DCI), and the first bit field is in the DCI.

3. The method according to claim 2, wherein
when the DCI comprises only scheduling information, bits comprised in the first bit field are at least one of first to eighth unused bits in a short messages field and six unused most significant bits in the DCI;
when the DCI comprises a short message, bits comprised in the first bit field are at least one of the third to the eighth unused bits in a short messages field and six unused most significant bits in the DCI; or
when two bits in a short message indicator field indicate a reserved state, a bit comprised in the first bit field is at least one of all bits in the DCI other than the two bits.

4. The method according to claim 1, wherein
the second message comprises downlink control information (DCI), and a second bit field is in the DCI.

5. The method according to claim 4, wherein
when the DCI comprises only scheduling information, bits comprised in the second bit field are at least one of first to eighth unused bits in a short messages field and six unused most significant bits in the DCI;
when the DCI comprises a short message, bits comprised in the second bit field are at least one of the third to the eighth unused bits in a short messages field and six unused most significant bits in the DCI; or
when two bits in a short message indicator field indicate a reserved state, a bit comprised in the second bit field is at least one of all bits in the DCI other than the two bits.

6. The method according to claim 1, wherein
the second message further comprises a third bit field, and
the third bit field indicates whether configuration information of a reference signal resource in a current first message is different from configuration information of a reference signal resource in a previous first message, or
the third bit field indicates whether a system information block that is in the current first message and that carries configuration information of the reference signal resource is different from a system information block that is in the previous first message already obtained by the terminal device and that carries configuration information of the reference signal resource.

7. A communication apparatus, comprising:
a processor configured to:
   send a first message to a terminal device, wherein the first message includes configuration information of a reference signal resource; and
   send a second message to the terminal device, wherein the second message includes a first bit field, and the first bit field indicates an availability status of the reference signal resource.

8. The apparatus according to claim 7, wherein the second message comprises downlink control information (DCI), and the first bit field is in the DCI.

9. The apparatus according to claim 8, wherein
when the DCI comprises only scheduling information, bits comprised in the first bit field are at least one of first to eighth unused bits in a short messages field and six unused most significant bits in the DCI;
when the DCI comprises a short message, bits comprised in the first bit field are at least one of the third to the eighth unused bits in a short messages field and six unused most significant bits in the DCI; or
when two bits in a short message indicator field indicate a reserved state, a bit comprised in the first bit field is at least one of all bits in the DCI other than the two bits.

10. The apparatus according to claim 7, wherein the second message comprises downlink control information (DCI), and a second bit field is in the DCI.

11. The apparatus according to claim 10, wherein
when the DCI comprises only scheduling information, bits comprised in the second bit field are at least one of first to eighth unused bits in a short messages field and six unused most significant bits in the DCI;
when the DCI comprises a short message, bits comprised in the second bit field are at least one of the third to the eighth unused bits in a short messages field and six unused most significant bits in the DCI; or
when two bits in a short message indicator field indicate a reserved state, a bit comprised in the second bit field is at least one of all bits in the DCI other than the two bits.

12. The apparatus according to claim 7, wherein
the second message further comprises a third bit field, and
the third bit field indicates whether configuration information of a reference signal resource in a current first message is different from configuration information of a reference signal resource in a previous first message, or
the third bit field indicates whether a system information block that is in the current first message and that carries configuration information of the reference signal resource is different from a system information block that is in the previous first message already obtained by the terminal device and that carries configuration information of the reference signal resource.

13. The apparatus according to claim 12, wherein the second message comprises downlink control information (DCI), and the third bit field is in the DCI.

14. A communication apparatus, comprising:
a processor configured to:
   receive a first message from a network device, wherein the first message includes configuration information of a reference signal resource;
   receive a second message from the network device, wherein
   the second message includes a first bit field, and
   the first bit field indicates an availability status of the reference signal resource; and
perform measurement based on the first message and the second message.

15. The apparatus according to claim 14, wherein the second message comprises downlink control information (DCI), and the first bit field is in the DCI.

16. The apparatus according to claim 15, wherein
when the DCI comprises only scheduling information, bits comprised in the first bit field are at least one of first to eighth unused bits in a short messages field and six unused most significant bits in the DCI;
when the DCI comprises a short message, bits comprised in the first bit field are at least one of the third to the eighth unused bits in a short messages field and six unused most significant bits in the DCI; or
when two bits in a short message indicator field indicate a reserved state, a bit comprised in the first bit field is at least one of all bits in the DCI other than the two bits.

17. The apparatus according to claim 14, wherein
the second message comprises downlink control information (DCI), and a second bit field is in the DCI, and
when the DCI comprises only scheduling information, bits comprised in the second bit field are at least one of first to eighth unused bits in a short messages field and six unused most significant bits in the DCI;
when the DCI comprises a short message, bits comprised in the second bit field are at least one of the third to the eighth unused bits in a short messages field and six unused most significant bits in the DCI; or
when two bits in a short message indicator field indicate a reserved state, a bit comprised in the second bit field is at least one of all bits in the DCI other than the two bits.

18. The apparatus according to claim 14, wherein
the second message further comprises a third bit field,
the third bit field indicates whether configuration information of a reference signal resource in a current first message is different from configuration information of a reference signal resource in a previous first message, or
the third bit field indicates whether a system information block that is in the current first message and that carries configuration information of the reference signal resource is different from a system information block that is in the previous first message already obtained by the terminal device and that carries configuration information of the reference signal resource,
the second message comprises downlink control information (DCI), and
the third bit field is in the DCI.

19. The apparatus according to claim 7, wherein
the second message is sent to the terminal device after sending the first message, and
the second message enables the terminal device to perform radio resource management (RRM), beam management (BM), and/or time-frequency tracking based on the first message and the second message.

20. The apparatus according to claim 14, wherein
the second message is received by the terminal device after the first message, and
the terminal device performs radio resource management (RRM), beam management (BM), and/or time-frequency tracking based on the first message and the second message.

* * * * *